United States Patent
Wang et al.

(10) Patent No.: US 12,367,027 B2
(45) Date of Patent: Jul. 22, 2025

(54) OPERATING SYSTEM UPGRADE METHOD, DEVICE, STORAGE MEDIUM, AND COMPUTER PROGRAM PRODUCT

(71) Applicant: Honor Device Co., Ltd., Shenzhen (CN)

(72) Inventors: Yanzhao Wang, Shenzhen (CN); Zenghui Zhang, Shenzhen (CN); Chao Chen, Shenzhen (CN); Jiulin Huang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/922,087

(22) PCT Filed: Jun. 15, 2022

(86) PCT No.: PCT/CN2022/098818
§ 371 (c)(1),
(2) Date: Oct. 28, 2022

(87) PCT Pub. No.: WO2022/262744
PCT Pub. Date: Dec. 22, 2022

(65) Prior Publication Data
US 2024/0220225 A1 Jul. 4, 2024

(30) Foreign Application Priority Data
Jun. 15, 2021 (CN) .......................... 202110661780.4

(51) Int. Cl.
*G06F 8/65* (2018.01)
*G06F 8/61* (2018.01)
*G06F 9/4401* (2018.01)

(52) U.S. Cl.
CPC .................. *G06F 8/65* (2013.01); *G06F 8/61* (2013.01); *G06F 9/4401* (2013.01)

(58) Field of Classification Search
CPC ............. G06F 8/61; G06F 8/65; G06F 9/4401
(Continued)

(56) References Cited

U.S. PATENT DOCUMENTS 7,689,565 B1 * 3/2010 Gandhi .................. G06F 16/27
707/999.01
9,633,051 B1 4/2017 Maccanti et al.
(Continued)

FOREIGN PATENT DOCUMENTS

CN 103678030 A 3/2014
CN 103679030 A 3/2014
(Continued)

OTHER PUBLICATIONS

Chao Shi, et al, "Design and implementation of OTA differential upgrade system based on Android platform OTA," Information Technology, Article No. 1009-2552 (2017); pp. 137-140; 12 total pages (including English translation).
(Continued)

*Primary Examiner* — Bradford F Wheaton
(74) *Attorney, Agent, or Firm* — Rimon PC

(57) ABSTRACT

Embodiments of this application provide an operating system upgrade method applied to an electronic device, and the method includes: obtaining a first upgrade installation package, where the first upgrade installation package includes a first upgrade file; storing the first upgrade file in a user data partition; restarting the electronic device, and loading data in a basic partition and a second static partition; loading data in another sub-partition other than a first sub-partition in a dynamic partition, and loading the first upgrade file; and merging the first upgrade file into the first sub-partition of the dynamic partition. The method further includes: synchronizing data in a first static partition to the second static partition. According to the method in embodiments of this
(Continued)

application, independent upgrade may be performed on a customized sub-partition in a dynamic partition, to upgrade a customized operating system.

19 Claims, 27 Drawing Sheets

(58) Field of Classification Search
USPC .......................................................... 717/168
See application file for complete search history.

(56) References Cited

U.S. PATENT DOCUMENTS

| | | | |
|---|---|---|---|
| 10,108,690 B1* | 10/2018 | Murray | G06F 16/278 |
| 2008/0287070 A1* | 11/2008 | King | H04B 1/40 |
| | | | 455/73 |
| 2011/0208929 A1* | 8/2011 | McCann | G06F 3/0664 |
| | | | 718/1 |
| 2012/0291021 A1 | 11/2012 | Banerjee et al. | |
| 2015/0046749 A1* | 2/2015 | Kumagai | G06F 11/1417 |
| | | | 714/15 |
| 2015/0082297 A1* | 3/2015 | Parry | G06F 8/65 |
| | | | 717/173 |
| 2015/0331692 A1 | 11/2015 | Schekochikhin et al. | |
| 2015/0347124 A1 | 12/2015 | Sotani et al. | |
| 2017/0083710 A1* | 3/2017 | Chapman, III | G06F 3/067 |
| 2017/0242767 A1* | 8/2017 | Wang | G06F 11/2094 |
| 2018/0052674 A1* | 2/2018 | Freese | G06F 16/178 |
| 2018/0262566 A1* | 9/2018 | Liu | G06F 12/0246 |
| 2019/0364036 A1* | 11/2019 | Simpson | H04W 4/60 |
| 2020/0341746 A1 | 10/2020 | Mehra et al. | |
| 2021/0141626 A1 | 5/2021 | Ladkani et al. | |
| 2022/0100403 A1* | 3/2022 | Tiwari | G06F 11/1441 |

FOREIGN PATENT DOCUMENTS

| | | |
|---|---|---|
| CN | 104918114 A | 9/2015 |
| CN | 105573780 A | 5/2016 |
| CN | 106775650 A | 5/2017 |
| CN | 107967141 A | 4/2018 |
| CN | 109032846 A | 12/2018 |
| CN | 109408153 A | 3/2019 |
| CN | 109885325 A | 6/2019 |
| CN | 110321148 A | 10/2019 |
| CN | 110543321 A | 12/2019 |
| CN | 112783537 A | 5/2021 |
| CN | 113821233 A | 12/2021 |
| CN | 114116023 A | 3/2022 |
| WO | 2017067448 A1 | 4/2017 |
| WO | 2019237222 A1 | 12/2019 |

OTHER PUBLICATIONS

Chao Shi, "The Research and Design of Incremental OTA Upgrade System Based on Android Platform", Jiangsu University, Master Dissertation, 2017; 56 pages.

* cited by examiner

OPERATING SYSTEM UPGRADE METHOD, DEVICE, STORAGE MEDIUM, AND COMPUTER PROGRAM PRODUCT

CROSS-REFERENCE TO RELATED APPLICATIONS

This application is a National Stage of International Application No. PCT/CN2022/098818, filed on Jun. 15, 2022, which claims priority to Chinese Patent Application No. 202110661780.4, filed on Jun. 15, 2021, both of which are hereby incorporated by reference in their entireties.

TECHNICAL FIELD

This application relates to the field of computer technologies, and specifically, to an operating system upgrade method, a device, a storage medium, and a computer program product.

BACKGROUND

In an application scenario in the conventional technology, a user terminal can be used by a user only after an operating system is installed on the user terminal. For example, a mobile phone can be used by a user only after a mobile phone operating system (such as an iOS system or an Android system) is installed on the mobile phone. Usually, an operating system of a terminal device is provided by an operating system supplier (for example, an operating system supplier of an Android system is Google). Usually, the operating system provided by the operating system supplier is a basic operating system, includes only the most basic function, and cannot fully meet an application requirement of a user. Therefore, to improve user experience, a terminal device supplier optimizes the basic operating system based on different customer requirements and application scenarios, and adds customized content to the basic operating system, to construct a customized operating system. The customized operating system is installed on the terminal device, so that the terminal device can provide an optimized system function. For example, before delivery of the mobile phone, a customer service system of a specified network operator is added to the Android system, so that the mobile phone can log in to a user account of a user for the network operator after being powered on, to implement functions such as charging and top-up.

After the operating system is installed on the terminal device, when there is an upgraded version for the operating system, the operating system installed on the terminal device needs to be upgraded. Usually, an operating system upgrade solution is provided by the operating system supplier. However, because the operating system provided by the operating system supplier is the basic operating system, the operating system upgrade solution provided by the operating system supplier corresponds to the basic operating system. The customized operating system is different from the basic operating system provided by the operating system supplier, and cannot completely follow an upgrade method for the basic operating system. Therefore, an operating system upgrade method for the customized operating system is needed.

SUMMARY

In view of this, this application provides an operating system upgrade method, a device, a storage medium, and a computer program product, to help resolve a problem of upgrading a customized operating system in the conventional technology.

According to a first aspect, an embodiment of this application provides an operating system upgrade method, applied to an electronic device. The electronic device includes a processor and a memory. The memory includes a basic partition, a first static partition, a second static partition, a dynamic partition, and a user data partition. The dynamic partition includes a plurality of sub-partitions. The electronic device loads data in the basic partition, the first static partition, and the dynamic partition after startup to run a first operating system. After the first operating system is run, the method includes:

obtaining a first upgrade installation package, where the first upgrade installation package includes a first upgrade file, the first upgrade file is an upgrade file for a first sub-partition, and the first sub-partition is a sub-partition of the dynamic partition;

creating a virtual dynamic partition in the user data partition, and storing the first upgrade file in the virtual dynamic partition;

modifying a startup sequence of the electronic device from starting from the first static partition to starting from the second static partition;

restarting the electronic device, and determining that a current startup sequence is starting from the second static partition;

loading data in the basic partition;

loading data in the second static partition;

loading data in another sub-partition other than the first sub-partition in the dynamic partition, and loading the first upgrade file in the user data partition; and merging the first upgrade file in the user data partition into the first sub-partition of the dynamic partition.

In an implementation of the first aspect, before the loading data in the second static partition, the method further includes: synchronizing data in the first static partition to the second static partition.

In an implementation of the first aspect, the synchronizing data in the first static partition to the second static partition includes:

reading data in each sub-partition of the first static partition; and overwriting the data in each sub-partition of the first static partition into a corresponding sub-partition in the second static partition.

In an implementation of the first aspect, the synchronizing data in the first static partition to the second static partition includes:

calculating a hash value of data in a third sub-partition, where the third sub-partition is a sub-partition of the first static partition;

calculating a hash value of data in a fourth sub-partition, where the fourth sub-partition is a sub-partition of the second static partition, and the fourth sub-partition corresponds to the third sub-partition; and overwriting the data in the third sub-partition into the fourth sub-partition when the hash value of the data in the third sub-partition is inconsistent with the hash value of the data in the fourth sub-partition.

In an implementation of the first aspect, after the first upgrade installation package is obtained, data in the first static partition is synchronized to the second static partition.

In an implementation of the first aspect, before the obtaining a first upgrade installation package, the method further includes:

loading data in the basic partition, the second static partition, and the dynamic partition to run a second operating system;

obtaining a second upgrade installation package, where the second upgrade installation package includes static partition upgrade data;

upgrading data in the first static partition based on the static partition upgrade data;

modifying the startup sequence of the electronic device from starting from the second static partition to starting from the first static partition;

restarting the electronic device, and determining that a current startup sequence is starting from the first static partition; and loading the data in the basic partition, the first static partition, and the dynamic partition to run the first operating system, where after the electronic device is restarted and it is determined that the current startup sequence is starting from the first static partition, the data in the first static partition is synchronized to the second static partition.

In an implementation of the first aspect, in a process of loading the data in the first static partition, the data in the first static partition is synchronized to the second static partition after static partition data verification succeeds.

In an implementation of the first aspect, in a process of loading data in the dynamic partition, the data in the first static partition is synchronized to the second static partition after verification on a to-be-loaded dynamic partition file succeeds.

In an implementation of the first aspect, the second upgrade installation package further includes dynamic partition upgrade data.

Before the restarting the electronic device, and determining that a current startup sequence is starting from the first static partition, the method further includes: creating a virtual dynamic partition in the user data partition, and storing the dynamic partition upgrade data in the virtual dynamic partition.

The loading the data in the basic partition, the first static partition, and the dynamic partition to run the first operating system includes: loading data in the dynamic partition and the dynamic partition upgrade data.

After the loading the data in the basic partition, the first static partition, and the dynamic partition to run the first operating system, the method further includes: merging the dynamic partition upgrade data into the dynamic partition.

After the dynamic partition upgrade data is merged into the dynamic partition, the data in the first static partition is synchronized to the second static partition.

In an implementation of the first aspect, the creating a virtual dynamic partition in the user data partition, and storing the first upgrade file in the virtual dynamic partition includes: storing the first upgrade file in the user data partition in a form of a COW file; and the loading data in the dynamic partition includes: loading, based on a snapshot technology, a file that needs to be loaded in the COW file of the first upgrade file and the dynamic partition.

In an implementation of the first aspect, the merging the first upgrade file in the user data partition into the first sub-partition of the dynamic partition includes:

overwriting the first upgrade file into the first sub-partition; and deleting the first upgrade file in the user data partition.

In an implementation of the first aspect, the first upgrade installation package further includes a second upgrade file, the second upgrade file is an upgrade file of a second sub-partition, and the second sub-partition is a sub-partition of the dynamic partition;

the method further includes: storing the second upgrade file in the virtual dynamic partition;

the loading data in the dynamic partition includes: loading data in another sub-partition other than the first sub-partition and the second sub-partition in the dynamic partition, and loading the first upgrade file and the second upgrade file in the user data partition; and after the loading data in the dynamic partition, the method further includes: merging the second upgrade file in the user data partition into the second sub-partition of the dynamic partition.

In an implementation of the first aspect, the first upgrade installation package further includes a static partition association file, the static partition association file is a static partition file associated with the first sub-partition, and before the electronic device is restarted, and it is determined that the current startup sequence is starting from the second static partition, the data in the first static partition is synchronized to the second static partition.

Before the restarting the electronic device, and determining that a current startup sequence is starting from the second static partition, and after the synchronizing data in the first static partition to the second static partition, the method further includes: updating a static partition association file in the second static partition by using the static partition association file in the first upgrade installation package.

In an implementation of the first aspect, after the restarting the electronic device, and determining that a current startup sequence is starting from the second static partition, the method further includes: synchronizing the data in the second static partition to the first static partition.

According to a second aspect, this application provides an electronic device. The electronic device includes a processor and a memory. The memory includes a basic partition, a first static partition, a second static partition, a dynamic partition, and a user data partition. The dynamic partition includes a plurality of sub-partitions. The processor is configured to execute software code stored in the memory, to enable the electronic device to load data in the basic partition, the first static partition, and the dynamic partition after startup to run a first operating system.

In addition, after the first operating system is run, the electronic device is enabled to perform the method procedure according to the first aspect.

According to a third aspect, this application provides a computer-readable storage medium. The computer-readable storage medium stores a computer program, and when the computer program is run on a computer, the computer is enabled to perform the method according to the first aspect.

According to a fourth aspect, this application provides a computer program product. The computer program product includes a computer program, and when the computer program is run on a computer, the computer is enabled to perform the method according to the first aspect.

According to the foregoing technical solutions provided in embodiments of this application, at least the following technical effects may be implemented.

According to the method in embodiments of this application, independent upgrade may be performed on a customized sub-partition in a dynamic partition, to upgrade a customized operating system. According to the method in embodiments of this application, a data amount of an operating system upgrade installation package can be effectively reduced, and an operating system upgrade procedure can be simplified.

BRIEF DESCRIPTION OF DRAWINGS

To describe the technical solutions in embodiments of this application more clearly, the following briefly describes the accompanying drawings for describing the embodiments. It is clear that, the accompanying drawings in the following description show merely some embodiments of this application, and a person of ordinary skill in the art may still derive other drawings from these accompanying drawings without creative efforts.

DESCRIPTION OF EMBODIMENTS

To better understand the technical solutions of this application, the following describes embodiments of this application in detail with reference to the accompanying drawings.

It should be noted that the described embodiments are merely some but not all of embodiments of this application. Based on embodiments of this application, all other embodiments obtained by a person of ordinary skill in the art without creative efforts fall within the protection scope of this application.

Terms used in embodiments of this application are merely for the purpose of describing specific embodiments, but are not intended to limit this application. Terms "a", "the", and "this" in singular forms in embodiments of this application and the appended claims are also intended to include plural forms, unless otherwise stated in the context clearly.

It should be understood that the term "and/or" used in this specification is merely an association relationship for describing associated objects, and indicates that there may be three relationships. For example, A and/or B may indicate the following three cases: Only A exists, both A and B exist, and only B exists. In addition, the character "/" in this specification usually indicates an "or" relationship between the associated objects.

Figure 1:
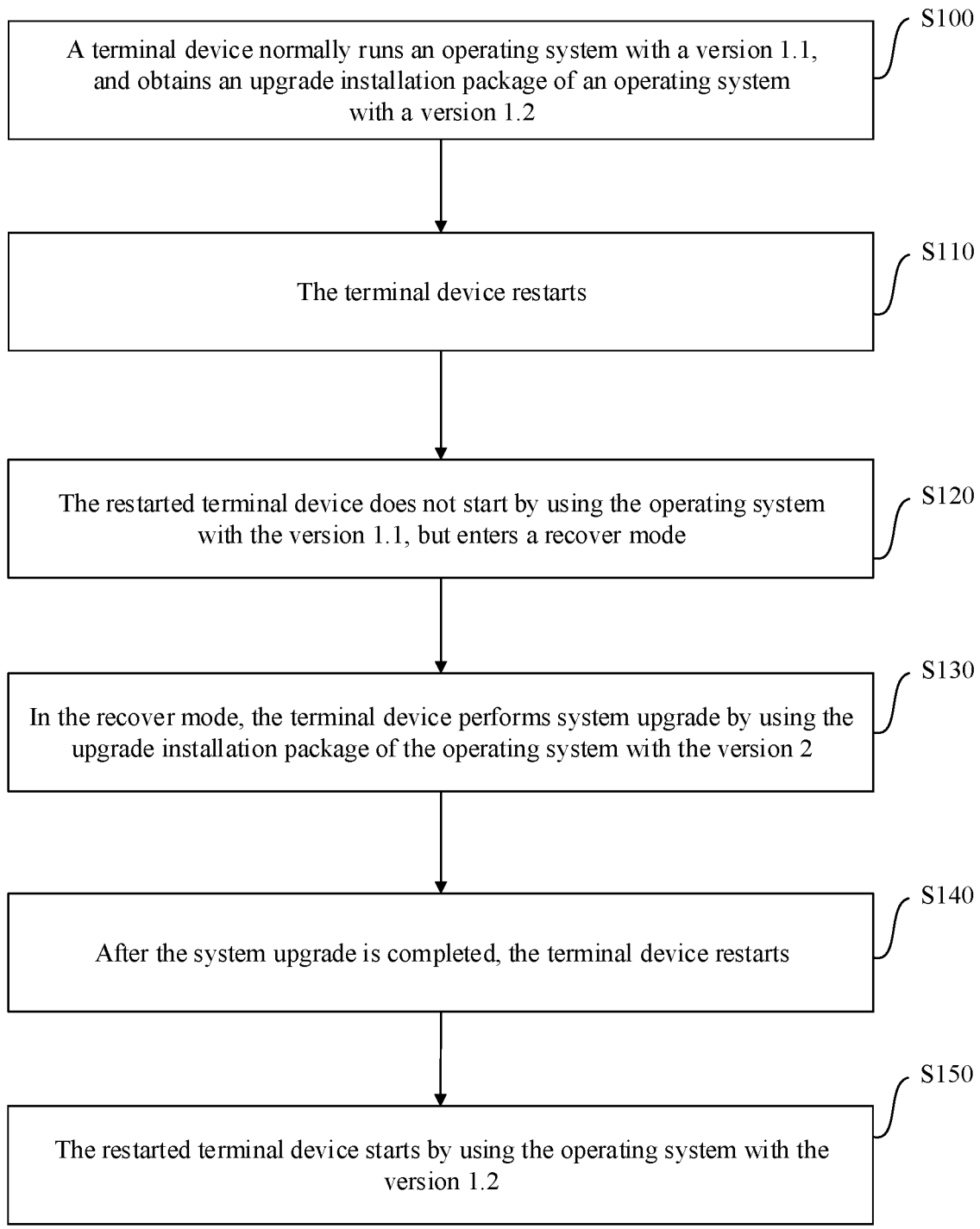
FIG. 1 is a flowchart of operating system upgrade according to an embodiment of this application.

In an actual application scenario, there is a requirement for upgrading an operating system of a terminal device. Upgrade of the operating system relates to file modification of the operating system, and some files of the operating system cannot be modified in a running process. Therefore, a feasible operating system upgrade solution is to exit a running state of the operating system and enter a recovery (Recovery) mode to upgrade the operating system. A mobile phone is used as an example. FIG. 1 is a flowchart of operating system upgrade according to an embodiment of this application. It is assumed that a version of an operating system currently run on the terminal device is 1.1 and needs to be upgraded to a version 1.2. The terminal device upgrades the operating system according to a procedure shown in FIG. 1.

S100: The terminal device normally runs the operating system with the version 1.1, and obtains an upgrade installation package of an operating system with the version 1.2.

For example, in a feasible implementation, the device periodically initiates a package search request to a package search server, where the package search request includes a version number (for example, version 1.1) of an operating system currently run on the device; the package search server retrieves, based on the operating system version number in the package search request, whether there is currently an operating system installation package with an updated version number (for example, version 1.2); when there is an operating system installation package with an updated version, the package search server feeds back a download address of the operating system upgrade installation package (for example, an operating system upgrade package for upgrade from the version 1.1 to the version 1.2) to the device; and the device downloads the operating system upgrade installation package based on the download address of the operating system upgrade installation package.

S110: The terminal device restarts.

S120: The restarted terminal device does not start by using the operating system with the version 1.1, but enters a recovery mode.

S130: In the recovery mode, the terminal device performs system upgrade by using the upgrade installation package of the operating system with the version 1.2.

S140: After the system upgrade is completed, the terminal device restarts.

S150: The restarted terminal device starts by using the operating system with the version 1.2.

In the solution shown in FIG. 1, the terminal device can perform system upgrade only after the terminal device restarts and enters the recovery mode. After the terminal device enters the recovery mode, most functions of the terminal device cannot be used. To be specific, in a process of upgrading the operating system of the terminal device, a user can only wait for the terminal device to update and upgrade a system file, but cannot normally use the terminal device. This greatly reduces user experience. Therefore, in a feasible operating system upgrade solution, the operating system is not upgraded in the recovery mode, but an A/B upgrade solution is used to perform senseless upgrade during normal running of the terminal device.

Figure 2:
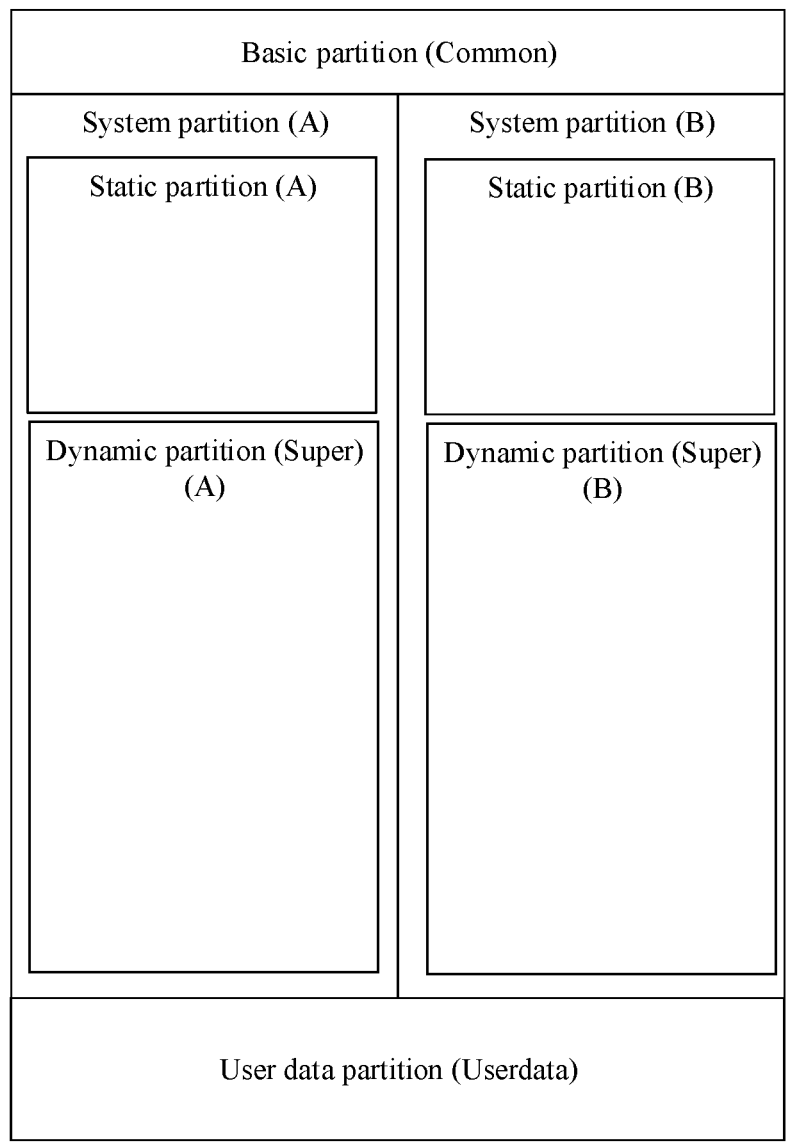
FIG. 2 is a schematic diagram of a data storage structure according to an embodiment of this application.

FIG. 2 is a schematic diagram of a data storage structure according to an embodiment of this application. As shown in FIG. 2, a data storage area on a terminal device is divided into four parts: a basic partition (Common), a system partition (A), a system partition (B), and a user data partition (Userdata).

The user data partition (Userdata) is used to store personal data of a user, for example, an app installed by the user, and a picture, a document, and a video stored by the user. Data stored in a basic part is system data that is not related to operating system upgrade, for example, a basic partition (Common) in Android system data. The system partition (A) and the system partition (B) are independent of each other, and each store complete operating system data. For example, the system partition (A) and the system partition (B) each include a static partition (bootloader, boot, vendor_boot, dtbo, vbmeta) and a dynamic partition (Super). As shown in FIG. 2, the system partition (A) includes a static partition (A) and a dynamic partition (Super) (A), and the system partition (B) includes a static partition (B) and a dynamic partition (Super) (B).

Figure 3:
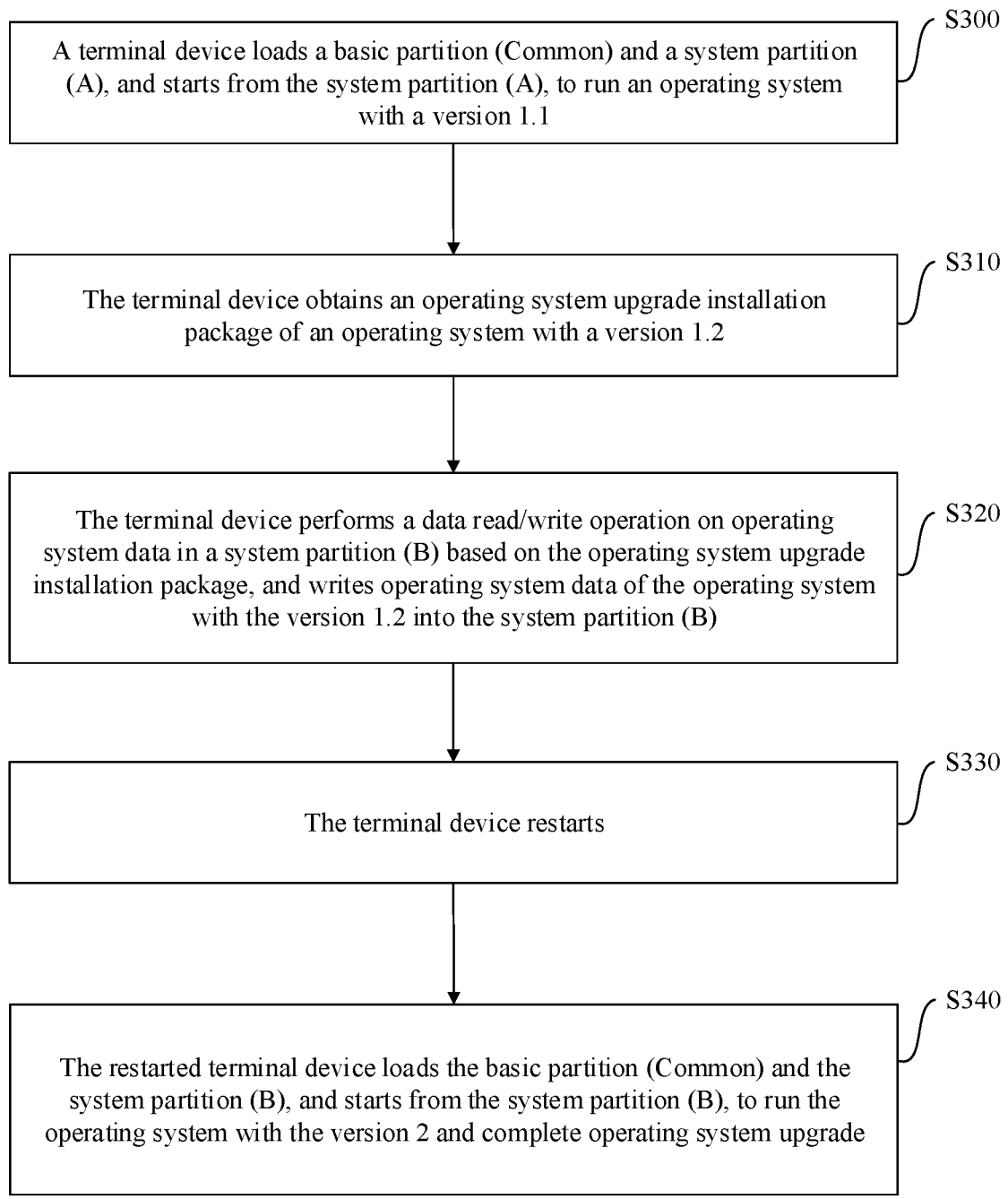
FIG. 3 is a flowchart of operating system upgrade according to an embodiment of this application.

FIG. 3 is a flowchart of operating system upgrade for the storage structure of the terminal device in the embodiment shown in FIG. 2. It is assumed that an operating system version corresponding to the operating system data stored in the system partition (A) is 1.1. The terminal device starts from the system partition (A), to run an operating system with the version 1.1. It is assumed that upgrade to an operating system with a version 1.2 needs to be performed currently. The terminal device upgrades the operating system according to a procedure shown in FIG. 3.

S300: The terminal device loads the basic partition (Common) and the system partition (A), and starts from the system partition (A), to run the operating system with the version 1.1.

S310: The terminal device obtains an operating system upgrade installation package of the operating system with the version 1.2.

S320: The terminal device performs a data read/write operation on the operating system data in the system partition (B) based on the operating system upgrade installation package, and writes operating system data of the operating system with the version 1.2 into the system partition (B).

In S320, the data write operation in operating system upgrade is performed for the system partition (B), and does not affect data in the system partition (A). Therefore, in an entire operating system upgrade process, a user can normally use the terminal device.

S330: The terminal device restarts.

After S320, because the data in the system partition (A) does not change, the terminal device does not need to restart immediately (S330 does not need to be performed immediately), and the user may autonomously select a restart occasion. In this way, the operating system upgrade process does not affect use of the terminal device by the user. This greatly improves user experience.

S340: The restarted terminal device loads the basic partition (Common) and the system partition (B), and starts from the system partition (B), to run the operating system with the version 1.2 and complete operating system upgrade.

Based on the solution shown in FIG. 2 and FIG. 3, although senseless upgrade can be performed during normal running of the terminal device, when the terminal device is normally used, in a non-upgrade state, only one of the system partition (A) and the system partition (B) is used, and the other partition is idle. As a result, data storage space utilization is low, and data storage space that can be freely used by the user is greatly reduced. Therefore, in a feasible operating system upgrade solution, a virtual partition-based A/B upgrade solution is used.

Figure 4:
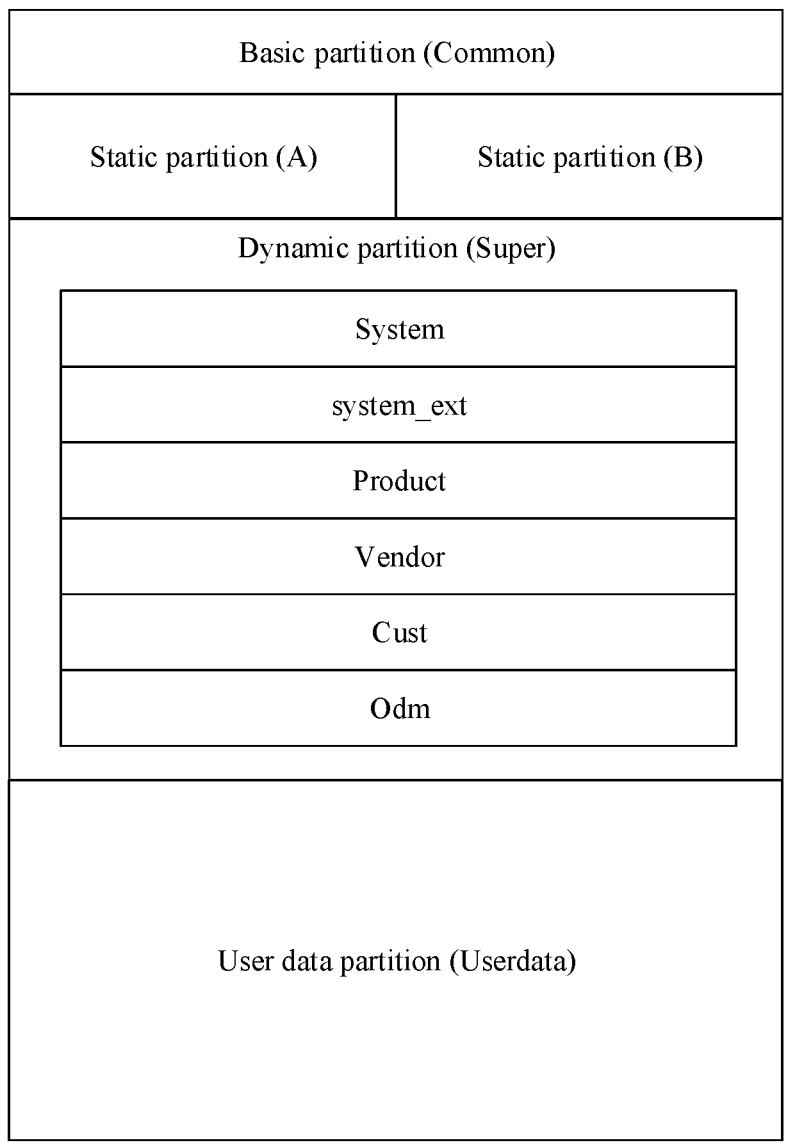
FIG. 4 is a schematic diagram of a data storage structure according to an embodiment of this application.

An Android system is used as an example. FIG. 4 is a schematic diagram of a data storage structure according to an embodiment of this application. As shown in FIG. 4, a data storage area of the Android system includes a basic partition (Common), a static partition (A), a static partition (B), a dynamic partition (Super), and a user data partition (Userdata).

The user data partition (Userdata) is used to store personal data of a user, for example, an app installed by the user, and a picture, a document, and a video stored by the user. Data stored in a basic part is system data that is not related to operating system upgrade. A structure of the static partition (A) corresponds to a structure of the static partition (B), and sub-partition names are distinguished from each other by using suffixes_a and _b. For example, the static partition (A) includes bootloader_a, boot_a, vendor_boot_a, dtbo_a, and vbmeta_a, and the static partition (B) includes bootloader_b, boot_b, vendor_boot_b, dtbo_b, and vbmeta_b. The dynamic partition (Super) includes a plurality of sub-partitions (System, system_ext, vendor, product, Cust, Odm).

When a device starts, the device starts from a static partition. For example, the device starts from the static partition (A), and sequentially loads the basic partition (Common), the static partition (A), and the dynamic partition (Super); or the device starts from the static partition (B), and sequentially loads the basic partition (Common), the static partition (B), and the dynamic partition (Super).

A universal flash storage (Universal Flash Storage, UFS) in a master boot record (Master Boot Record, MBR) format is used as an example. An MBR (which is a master boot sector and the first sector of the UFS, that is, 0-cylinder 0-head 1-sector of a C/H/S address) of the UFS stores a device startup sequence description, for example, starting from the static partition (A) (a startup sequence identifier is A) or starting from the static partition (B) (a startup sequence identifier is A). After the device starts, the device first reads a device startup sequence from the MBR of the UFS.

Figure 5:
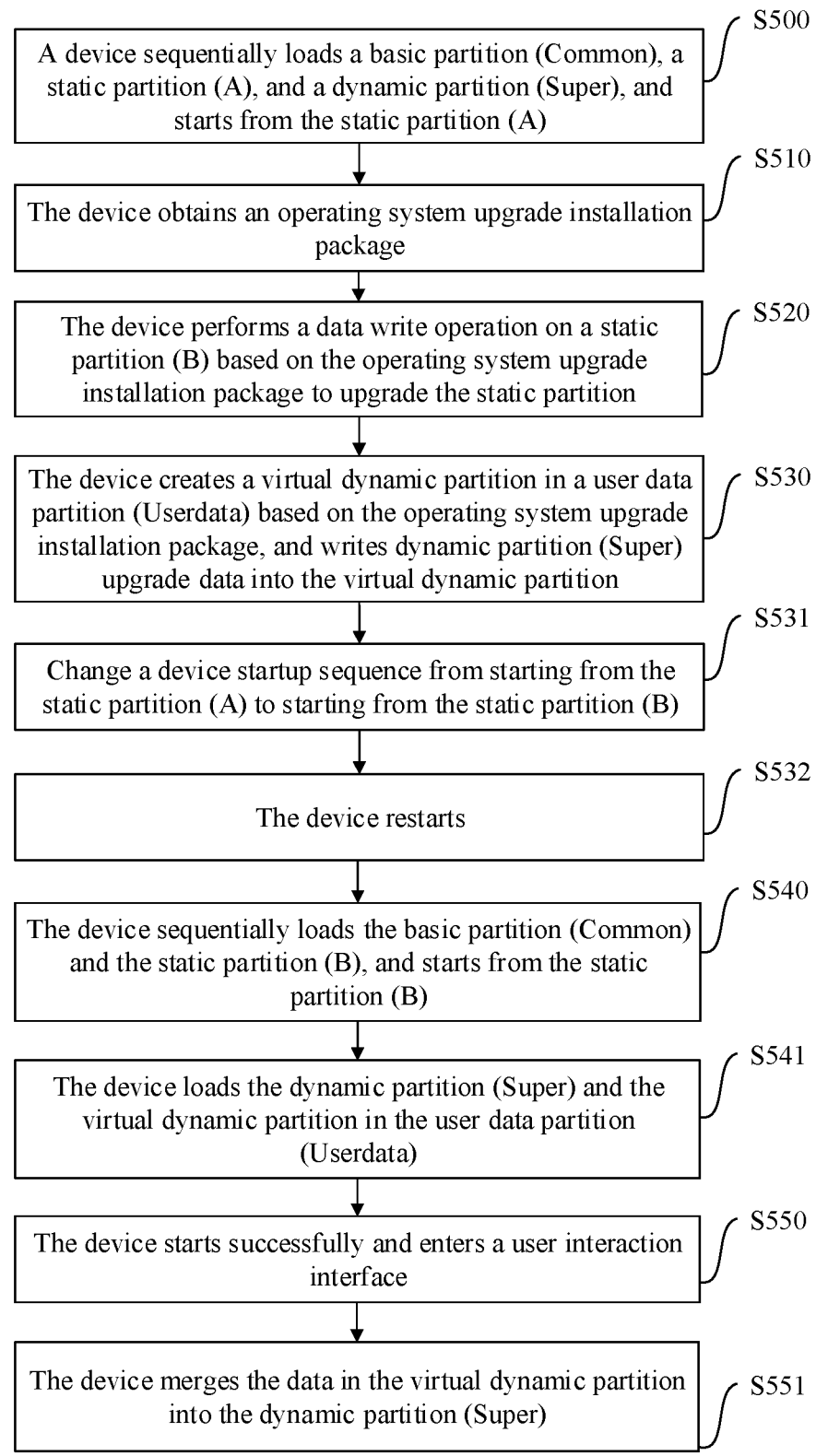
FIG. 5 is a flowchart of operating system upgrade according to an embodiment of this application.

FIG. 5 is a flowchart of operating system upgrade for the data storage structure of the operating system in the embodiment shown in FIG. 4. When the device currently starts from the static partition (A), the device upgrades the operating system according to a procedure shown in FIG. 5.

S500: The device sequentially loads the basic partition (Common), the static partition (A), and the dynamic partition (Super), and starts from the static partition (A).

S510: The device obtains an operating system upgrade installation package.

For example, in a feasible implementation, the device periodically initiates a package search request to a package search server, where the package search request includes a version number (for example, version 1.1) of an operating system currently run on the device; the package search server retrieves, based on the operating system version number in the package search request, whether there is currently an operating system installation package with an updated version number (for example, version 1.2); when there is an operating system installation package with an updated version, the package search server feeds back a download address of the operating system upgrade installation package (for example, a system incremental upgrade installation package for upgrade from the version 1.1 to the version 1.2) to the device; and the device downloads the operating system upgrade installation package based on the download address of the operating system upgrade installation package.

S520: The device performs a data write operation on the static partition (B) based on the operating system upgrade installation package to upgrade the static partition.

For example, the system incremental upgrade installation package for upgrade from the version 1.1 to the version 1.2 includes full data of a static partition with the version 1.2, and the device overwrites the data of the static partition with the version 1.2 into the static partition (B).

S530: The device creates a virtual dynamic partition in the user data partition (Userdata) based on the operating system upgrade installation package, and writes dynamic partition (Super) upgrade data into the virtual dynamic partition. For example, the operating system upgrade installation package includes data of a dynamic partition with the version 1.2, and the device writes the data of the dynamic partition (Super) with the version 1.2 into the virtual dynamic partition.

Further, in a virtual A/B upgrade solution, an incremental upgrade manner is used for the dynamic partition (Super). During upgrade, the virtual dynamic partition in the user data partition (Userdata) stores not all files of the dynamic partition (Super) with the upgraded new version, but an upgrade result that is of the data to be upgraded in the dynamic partition (Super) with the old version and that is obtained after upgrade. In other words, the virtual dynamic partition in the user data partition (Userdata) stores update data of the dynamic partition.

A system sub-partition is used as an example. It is assumed that in the version 1.1, data in the system sub-partition may be divided into two parts: system1 and system2. During upgrade from the version 1.1 to the version 1.2, the data system2 does not change, and the data system1 is upgraded to system3. In this case, in S530, the device creates the virtual dynamic partition in the user data partition (Userdata), and writes the data system3 into the virtual dynamic partition.

For example, the system incremental upgrade installation package for upgrade from the version 1.1 to the version 1.2 includes dynamic partition (Super) update data for upgrade from the version 1.1 to the version 1.2, and the dynamic partition (Super) update data includes the data system3.

Further, in the virtual A/B upgrade solution, incremental upgrade of the dynamic partition (Super) is implemented based on a snapshot (snapshot) technology. Specifically, in the virtual dynamic partition in the user data partition (Userdata), a copy-on-write (Copy-On-Write, COW) file is used to store the dynamic partition (Super) upgrade data.

Specifically, the dynamic partition (Super) upgrade data stored in the user data partition (Userdata) includes a plurality of COW files, each COW file is corresponding to one sub-partition of the dynamic partition (Super), and a name of the COW file is corresponding to the sub-partition of the dynamic partition (Super).

In the operating system upgrade installation package obtained in S510, the COW file in the dynamic partition (Super) upgrade data is compressed and stored in a form of binary code. In the operating system upgrade installation package, each COW file is named based on the sub-partition of the dynamic partition (Super) corresponding to the COW file. For example, a COW file corresponding to the system sub-partition is named system-cow-img.img.0000.

In S530, the device unpacks the operating system upgrade installation package to obtain all COW files, and adds an A/B partition tag to each COW file. Specifically, when the device currently starts from the static partition (A), it may be understood that a dynamic partition (Super) currently loaded by the device to run the operating system is a dynamic partition (A). When the operating system is upgraded, the virtual dynamic partition created in the user data partition (Userdata) is for a dynamic partition (B). Therefore, a name tag_b corresponding to the dynamic partition (B) is added to a COW file. For example, _b is added to system-cow-img.img.0000 to generate system_b-cow-img.img.0000.

Further, in S530, an update folder is created in the user data partition (Userdata), and a renamed COW file is stored in the update folder. For example, in an application scenario, after the COW file is written into the user data partition (Userdata), the update folder in the user data partition (Userdata) includes the following files:

system_b-cow-img.img.0000;
system_ext_b-cow-img.img.0000;
vendor_b-cow-img.img.0000;
product_b-cow-img.img.0000;
cust_b-cow-img.img.0000;
odm_b-cow-img.img.0000.

Specifically, the COW file includes a COW file map (snapshot map) of the COW file and upgrade data.

The COW file map (snapshot) corresponds to a file map of a sub-partition of a dynamic partition (Super) corresponding to the COW file. The file map of the sub-partition of the dynamic partition (Super) is used to describe all files in a sub-partition of a dynamic partition (Super) of an operating system with a current version (version before current upgrade, for example, version 1.1) and a storage address of each file.

The upgrade data in the COW file is an updated file in sub-partition data of a new version compared with sub-partition data of the current version. The COW file map of the COW file is used to describe a correspondence between the updated file and a file in a sub-partition with the current version and a storage address of the updated file.

Based on the file map of the sub-partition of the dynamic partition (Super) and the COW file map of the COW file, the upgrade data in the COW file may be used to replace the corresponding file in the sub-partition of the dynamic partition (Super), to upgrade data in the dynamic partition (Super). Specifically, when the file map of the sub-partition of the dynamic partition (Super) needs to be obtained, a snapshot operation may be performed on the data in the sub-partition of the dynamic partition (Super) based on a snapshot, to generate the file map of the sub-partition of the dynamic partition (Super). Alternatively, when the operating system upgrade installation package is created, the file map of the sub-partition of the dynamic partition (Super) may be generated in advance, and the file map is added to the COW file.

The system sub-partition is used as an example. It is assumed that data is stored in the system sub-partition according to the following paths:

/system/app/A0.XXX;
/system/app/A1.XXX;
/system/app/A2.XXX;
/system/B0.XXX;
/system/B1.XXX;
/system/user/C0.XXX;
/system/user/C1.XXX;
/system/user/C2.XXX;
/system/user/C3.XXX.

A file map of the system sub-partition may be:

/system/app/A0.XXX: 024010~024013;
/system/app/A1.XXX: 024014~024017;
/system/app/A2.XXX: 024018~024020;
/system/B0.XXX: 024021~024026;
/system/B1.XXX: 024027~024028;
/system/user/C0.XXX: 024029~024032;
/system/user/C1.XXX: 024033~024035;
/system/user/C2.XXX: 024036~024040;
/system/user/C3.XXX: 024041~024044.

A value following a file name (for example, 024010~024013 in /system/app/A0.XXX: 024010~024013) is a physical storage address (block address) of the file in the system sub-partition of the dynamic partition (Super).

It is assumed that data/system/app/A2.XXX and data/system/user/C2.XXX need to be updated in current operating system upgrade.

It may be considered that:

/system/app/A2.XXX and /system/user/C2.XXX are a system1 part of the data in the system sub-partition; and
/system/app/A0.XXX, /system/app/A1.XXX, /system/B0.XXX, /system/B1.XXX, /system/user/C0.XXX, /system/user/C1.XXX, and /system/user/C3.XXX are a system2 part of the data in the system sub-partition.

In this case, the COW file (system_b-cow-img.img.0000) corresponding to the system sub-partition includes the latest/system/app/A2.XXX and/system/user/C2.XXX.

It may be considered that the latest/system/app/A2.XXX and/system/user/C2.XXX are system3. An upgrade objective is to use system3 to update system1.

When a size of update data in the COW file is consistent with a size of to-be-updated original data, and a storage location of the update data in the COW file in the sub-partition after data update is consistent with a storage location of the to-be-updated original data in the sub-partition, the COW file map of the COW file (system_b-cow-img.img.0000) may be:

/system/app/A2.XXX:

Map1 (address of the to-be-updated data in the original super partition): start address (address start): 024018 (offset relative to a system start address); offset size (size): 2 (that is, data of an address segment 024018~024020);
Map2 (address of the update data stored in the cow file): start address (address start): 045033 (offset relative to a start address stored in the cow file); offset size (size): 2 (that is, data of an address segment 045033~045035);

/system/user/C2.XXX:

Map1 (address of the to-be-updated data in the original super partition): start address (address start): 024036 (offset relative to a system start address); offset size (size): 4 (that is, data of an address segment 024036~024040);
Map2 (address of the update data stored in the cow file): start address (address start): 045036 (offset relative to a start address stored in the cow file); offset size (size): 4 (that is, data of an address segment 045036~045040).

When a size of update data in the COW file is inconsistent with a size of to-be-updated original data, the COW file map of the COW file (system_b-cow-img.img.0000) may be:

/system/app/A2.XXX:

Map1.1 (address of the to-be-updated data in the original super partition): start address (address start): 024018 (offset relative to a system start address); offset size (size): 2 (that is, data of an address segment 024018~024020);
Map2.1 (address of the update data that is stored in the cow file and that needs to cover the Map1.1 address): start address (address start): 045033 (offset relative to a start address stored in the cow file); offset size (size): 2 (that is, data of an address segment 045033~045035);
Map1.2 (to-be-written address, in the original super partition, of an excess part of the update data in the cow file relative to the size of the to-be-updated data): start address (address start): 025018 (offset relative to a system start address); offset size (size): 1 (that is, data of an address segment 025018~025020);
Map2.2 (address of the update data that is stored in the cow file and that needs to cover the Map1.2 address): start address (address start): 046033 (offset relative to a start address stored in the cow file); offset size (size): 2 (that is, data of an address segment 046033~046035).

In the following description of the specification, for ease of description, only an application scenario in which the size of the update data in the COW file is consistent with the size of the to-be-updated original data, and the storage location of the update data in the COW file in the sub-partition after data update is consistent with the storage location of the to-be-updated original data in the sub-partition is used as an example for description.

In the foregoing example, address segments (045033~045035 and 045036~045040) are respectively physical storage addresses (block addresses) of the latest/system/app/A2.XXX and /system/user/C2.XXX in the COW file (system_b-cow-img.img.0000) in the user data partition (Userdata).

In this way, if A2.XXX on the address 045033~045035 is used to replace A2.XXX on the address 024018~024020, and C2.XXX on the address 045036~045040 is used to replace C2.XXX on the address 024036~024040, data upgrade of the system sub-partition of the dynamic partition (Super) can be completed.

Further, in S530, after the COW file is written into the user data partition (Userdata), overall verification further needs to be performed on the dynamic partition (Super) and the COW file, to verify validity of the dynamic partition (Super) and the COW file, and verify whether a combination result of the dynamic partition (Super) data and the COW file of the current version is dynamic partition (Super) data of a new version.

Specifically, upgrade from the version 1.1 to a version 1.3 is used as an example. A hash value of a combination result of data that does not need to be upgraded (data that does not change from the version 1.1 to the version 1.2) in the dynamic partition (Super) and upgrade data (data that needs to be upgraded from the version 1.1 to the version 1.2) in the COW file is calculated, and whether the hash value is consistent with a hash value of complete data in the dynamic partition (Super) with the version 1.3 is determined. If the hash values are consistent, it indicates that the COW file is valid. If the hash values are not consistent, it indicates that the COW file is invalid, the upgrade fails, the upgrade process is interrupted, and an error is reported. The hash value of the complete data in the dynamic partition (Super) with the version 1.3 is stored in the operating system upgrade installation package.

Specifically, in a verification process, the dynamic partition (Super) and the COW file are combined based on a snapshot. In an implementation process based on the snapshot, combination of the dynamic partition (Super) and the COW file is not physical combination, but combining the file map of the sub-partition of the dynamic partition (Super) and the COW file map of the COW file, to generate a file map of sub-partition data of a new version.

For example, the file map of the system sub-partition is combined with the COW file map. The file map of the system sub-partition is:

/system/app/A0.XXX: 024010~024013;
/system/app/A1.XXX: 024014~024017;
/system/app/A2.XXX: 024018~024020;
/system/B0.XXX: 024021~024026;
/system/B1.XXX: 024027~024028;
/system/user/C0.XXX: 024029~024032;
/system/user/C1.XXX: 024033~024035;
/system/user/C2.XXX: 024036~024040;
/system/user/C3.XXX: 024041~024044.

The COW file map is:

/system/app/A2.XXX: 045033~045035;
/system/user/C2.XXX: 045036~045040.

In this case, a new-version file map of the system sub-partition is obtained:

/system/app/A0.XXX: 024010~024013
(pointing to A0.XXX in /system/app in the dynamic partition (Super));
/system/app/A1.XXX: 024014~024017
(pointing to A1.XXX in /system/app in the dynamic partition (Super));
/system/app/A2.XXX: 045033~045035
(pointing to A2.XXX in /Update/system_b-cow-img.img.0000 in the user data partition
(Userdata));
/system/B0.XXX: 024021~024026
(pointing to B0.XXX in /system in the dynamic partition (Super));
/system/B1.XXX: 024027~024028
(pointing to B1.XXX in /system in the dynamic partition (Super));
/system/user/C0.XXX: 024029~024032
(pointing to C0.XXX in /system/user in the dynamic partition (Super));
/system/user/C1.XXX: 024033~024035
(pointing to C1.XXX in /system/user in the dynamic partition (Super));
/system/user/C2.XXX: 045036~045040
(pointing to C2.XXX in/Update/system_b-cow-img.img.0000 in the user data partition
(Userdata));
/system/user/C3.XXX: 024041~024044
(pointing to C3.XXX in /system/user in the dynamic partition (Super)).

In the file map of the system sub-partition with the new version, a storage address of /system/app/A2.XXX does not point to/system/app/A2.XXX in the dynamic partition (Super) in a memory, but points to A2.XXX in system_b-cow-img.img.0000 in the user data partition (Userdata) in the memory; and a storage address of/system/user/C2.XXX does not point to /system/user/C2.XXX in the dynamic partition (Super) in the memory, but points to C2.XXX in system_b-cow-img.img.0000 in the user data partition (Userdata) in the memory.

In a verification process, new-version file maps of all sub-partitions of the dynamic partition (Super) are obtained in the foregoing combination manner (if a corresponding COW file of a sub-partition is not written into the user data partition (Userdata), a file map of the sub-partition is directly used as a new-version file map). The new-version file maps of all the sub-partitions are combined to generate a new-version file system of the dynamic partition (Super).

Data is read based on the new-version file system of the dynamic partition (Super), to read all files included in the new-version file system of the dynamic partition (Super) and calculate a hash value.

When the COW file is valid, merging status information in a metadata partition (/metadata) in the basic partition (Common) is changed from "merged (merged)" to "wait for merge (wait for merge)". The merging status information is used to indicate whether there is currently a COW file that needs to be merged into the dynamic partition (Super). Specifically, the merging status information includes an overall identifier for the dynamic partition (Super) and a sub-partition identifier for each sub-partition. When the overall identifier is "merged (merged)", it indicates that a merging operation needs to be performed on none of all the sub-partitions of the dynamic partition (Super). When the overall identifier is "wait for merge (wait for merge)", it indicates that a merging operation needs to be performed on one or more sub-partitions of the dynamic partition (Super). When the sub-partition identifier is "merged (merged)", it indicates that a merging operation does not need to be performed on the sub-partition. When the sub-partition identifier is "wait for merge (wait for merge)", it indicates that a merging operation needs to be performed on the sub-partition.

S531: Change the device startup sequence from starting from the static partition (A) to starting from the static partition (B).

For example, the startup sequence identifier in the master boot record (Master Boot Record, MBR) is rewritten, to rewrite the startup sequence identifier from A to B. After the device is powered on, when the device learns that the startup sequence identifier is A, the device starts from the static partition (A), and loads the static partition (A) during startup; or when the device learns that the startup sequence identifier is B, the device starts from the static partition (B), and loads the static partition (B) during startup.

S532: The device restarts. The current operating system is exited, the device is powered off, and the device is powered on again.

S540: The device sequentially loads the basic partition (Common) and the static partition (B).

S541: The device loads the dynamic partition (Super) and the virtual dynamic partition in the user data partition (Userdata).

Specifically, the device reads the merging status information in the metadata (/metadata), determines, based on the merging status information, whether a COW file needs to be retrieved from a specified path in the user data partition (Userdata), and combines and loads the dynamic partition (Super) and the COW file based on a snapshot.

Further, in S541, the device does not load all COW files in the dynamic partition (Super) and the user data partition (Userdata), but loads a corresponding file based on an operating system running requirement. Specifically, in S541, the device determines, based on the operating system running requirement, a file that needs to be loaded, extracts the corresponding file from COW files in the dynamic partition (Super) or the virtual dynamic partition based on a snapshot, and loads the file.

Specifically, in S541, when the corresponding COW file exists in a sub-partition of the dynamic partition (Super), a new-version file map of each sub-partition of the dynamic partition (Super) is first generated based on the snapshot. For a process of generating the new-version file map, refer to S530. The device determines, based on the operating system running requirement, the file that needs to be loaded, and loads the file based on the new-version file map of the sub-partition of the dynamic partition (Super).

For example, the operating system running requirement is loading all data in a directory user in the system sub-partition (/system/user). The device reads the merging status information in the metadata (/metadata), and the sub-partition identifier of the system sub-partition in the merging status information is "wait for merge (wait for merge)". Therefore, the device searches for a COW file in/Update in the user data partition (Userdata), and after finding the COW file system_b-cow-img.img.0000 in Update, generates the new-version file map of the system sub-partition based on the snapshot and the file map of the COW file in system_b-cow-img.img.0000. Data is loaded based on storage addresses of all files in/system/user in the new-version file map of the system sub-partition, for example, based on the following in the new-version file map of the system sub-partition:

/system/user/C0.XXX: 024029~024032;
/system/user/C1.XXX: 024033~024035;
/system/user/C2.XXX: 045036~045040;
/system/user/C3.XXX: 024041~024044.

C0.XXX at the address 024029~024032, C1.XXX at the address 024033~024035, C2.XXX at the address 045036~045040, and C3.XXX at the address 024041~024044 are loaded.

Further, when all data in the directory user in the system sub-partition (/system/user) is loaded, and the sub-partition identifier of the system sub-partition in the merging status information is "merged (merged)", the device does not search for a COW file in/Update in the user data partition (Userdata), but directly loads all the data in the directory user in the system sub-partition (/system/user).

Further, when all data in the directory user in the system sub-partition (/system/user) is loaded, and the sub-partition identifier of the system sub-partition in the merging status information is "wait for merge (wait for merge)", if the device does not find the COW file corresponding to the system sub-partition in/Update in the user data partition (Userdata), it indicates that a data write error (COW file write error or merging status information write error) occurs in the upgrade process. In this case, the device rolls back the system and reports the error.

Further, in S541, before the file is loaded, the device further needs to verify the to-be-loaded file. Different from S530, in S541, overall verification is not performed on the dynamic partition (Super) and the COW file, but only the file that needs to be loaded is verified. For example, verification is performed based on dmverity (dm-verity is a target (target) of a dm (device mapper), is a virtual block device, and is specially used for file system verification). If the verification succeeds, the file is loaded. If the verification fails, the device is restarted, and the system is rolled back or the file is loaded again.

S550: The device starts successfully and enters a user interaction interface.

S551: The device merges the data in the virtual dynamic partition into the dynamic partition (Super).

In the description of the specification of this application, the merging operation means that in the operating system upgrade process, a dynamic partition (Super) upgrade file (COW file) stored in the virtual dynamic partition in the user data partition (Userdata) is written into the dynamic partition (Super), to complete data upgrade of a file in the dynamic partition (Super), so that the device does not need to load both the dynamic partition (Super) and the virtual dynamic partition during next startup, but needs to load only the dynamic partition (Super) to complete device startup.

Specifically, the device performs power-on broadcast after successful startup, and starts an upgrade process after power-on broadcast. The upgrade process reads the merging status information in the metadata (/metadata) in the basic partition (Common). If the merging status information is "merged (merged)", the device enters a normal running mode.

If the merging status information is "wait for merge (wait for merge)", the upgrade process merges the COW file in the user data partition (Userdata) into the dynamic partition (Super).

Specifically, the upgrade process writes the upgrade data in the COW file in the user data partition (Userdata) into a corresponding address in the dynamic partition (Super), so that all data in the dynamic partition (Super) is data of an upgraded new version.

For example, data at the address 045033~045035 is written into the address 024014~024017 based on/system/app/A2.XXX: 024018~024020 in the file map of the system sub-partition and/system/app/A2.XXX: 045033~045035 in the COW file map; and data at the address 045036~045040 is written into the address 024036~024040 based on /system/user/C2.XXX: 024036~024040 in the file map of system sub-partition and /system/user/C2.XXX: 045036~045040 in the COW file map.

Then, the upgrade process deletes the COW file in the user data partition (Userdata), and returns storage space to the user data partition (Userdata). In addition, the merging status information in the metadata (/metadata) in the basic partition (Common) is changed from "wait for merge (wait for merge)" to "merged (merged)".

In S520, a data operation of static partition upgrade is for operating system data in the static partition (B), and does not affect operating system data in the currently started static partition (A). In addition, in S530, a data operation of dynamic partition upgrade is completed in the virtual dynamic partition created in the user data partition (Userdata), and does not affect the currently loaded dynamic partition (Super). Therefore, in the entire operating system upgrade process, the user can normally use the device. In addition, after S531 is completed, the device does not need to restart immediately, but the user may autonomously select a restart occasion. In this way, the operating system upgrade process does not affect a normal mobile phone operation of the user. This greatly improves user experience. Further, for the dynamic partition (Super), the virtual dynamic partition is created in the user data partition (Userdata) only when upgrade needs to be performed. Therefore, data storage space utilization is effectively improved.

For a customized operating system, a feasible customized operating system architecture is to optimize the basic operating system comprehensively. A file storage structure that is completely different from that of the basic operating system is used. This greatly increases difficulty in constructing the customized operating system. To reduce difficulty in constructing the customized operating system, in an embodiment of this application, a customized partition is added on the basis of keeping the file storage architecture of the basic operating system unchanged, and customized data used to optimize the basic operating system and add a system function is stored in the customized partition.

Figure 6:
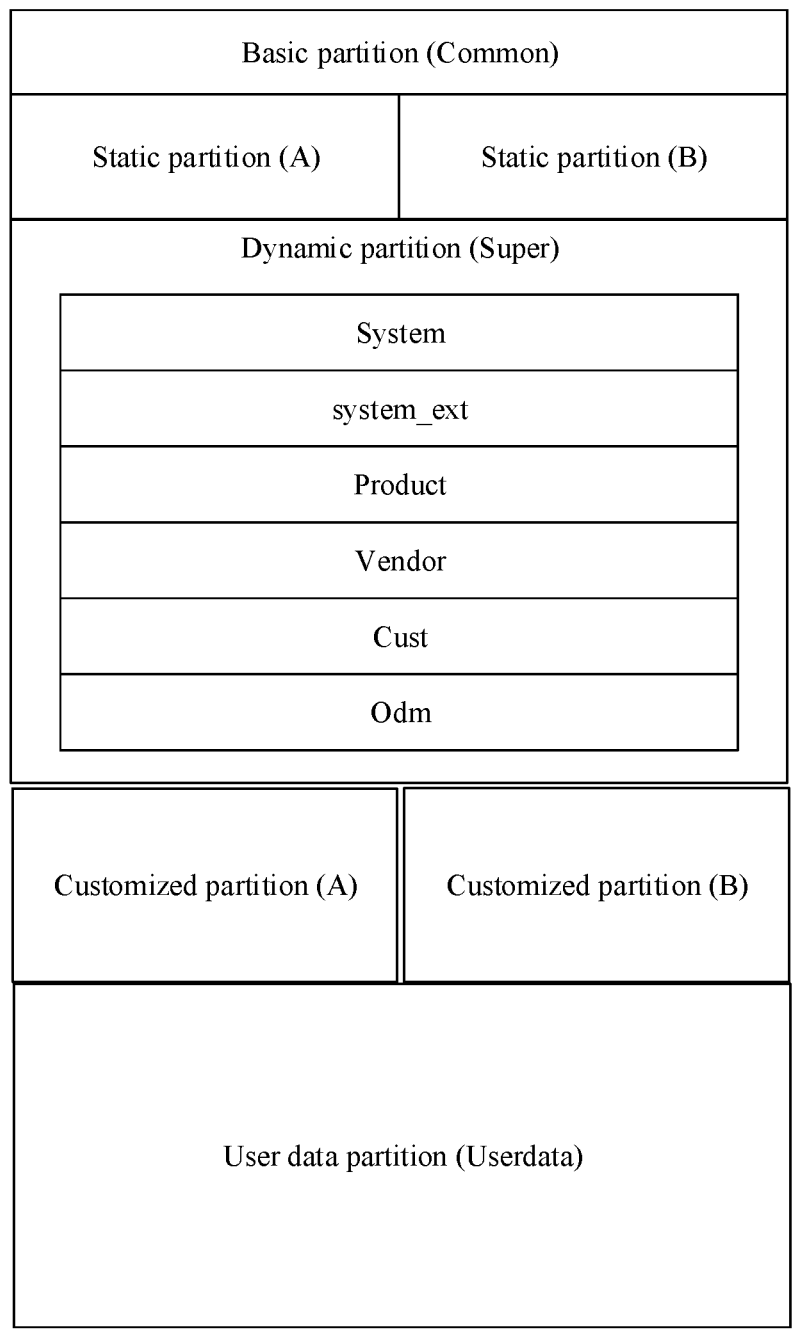
FIG. 6 is a schematic diagram of a data storage structure of an Android system on a terminal device.

Specifically, an Android system using a virtual A/B upgrade manner is used as an example. FIG. 6 is a schematic diagram of a data storage structure of the Android system on a terminal device. As shown in FIG. 6, a data storage area of the Android system includes a basic partition (Common), a static partition (A), a static partition (B), a dynamic partition (Super), a customized partition (A), a customized partition (B), and a user data partition (Userdata).

The customized partition (A) and the customized partition (B) are used to store customized data, and are storage partitions obtained through division in the data storage structure of the system before delivery of the device. The customized partition may be a partial partition obtained through division from the user data partition. When the device is delivered from the factory, the customized partition (A) and the customized partition (B) may be empty, so that a user or a manufacturer subsequently burns customized data. Alternatively, customized data may be burnt into the customized partition (A) and customized partition (B) in advance before delivery of the device.

A structure of the customized partition (A) corresponds to a structure of the customized partition (B), and sub-partition names are distinguished from each other by using suffixes_a and _b. For example, the customized partition (A) includes version_a and preload_a, and the customized partition (B) includes version_b and preload_b.

When the device starts, the device starts from a static partition. For example, the device starts from the static partition (A), and sequentially loads the basic partition (Common), the static partition (A), the dynamic partition (Super), and the customized partition (A); or the device starts from the static partition (B), and sequentially loads the basic partition (Common), the static partition (B), the dynamic partition (Super), and the customized partition (B).

Figure 7:
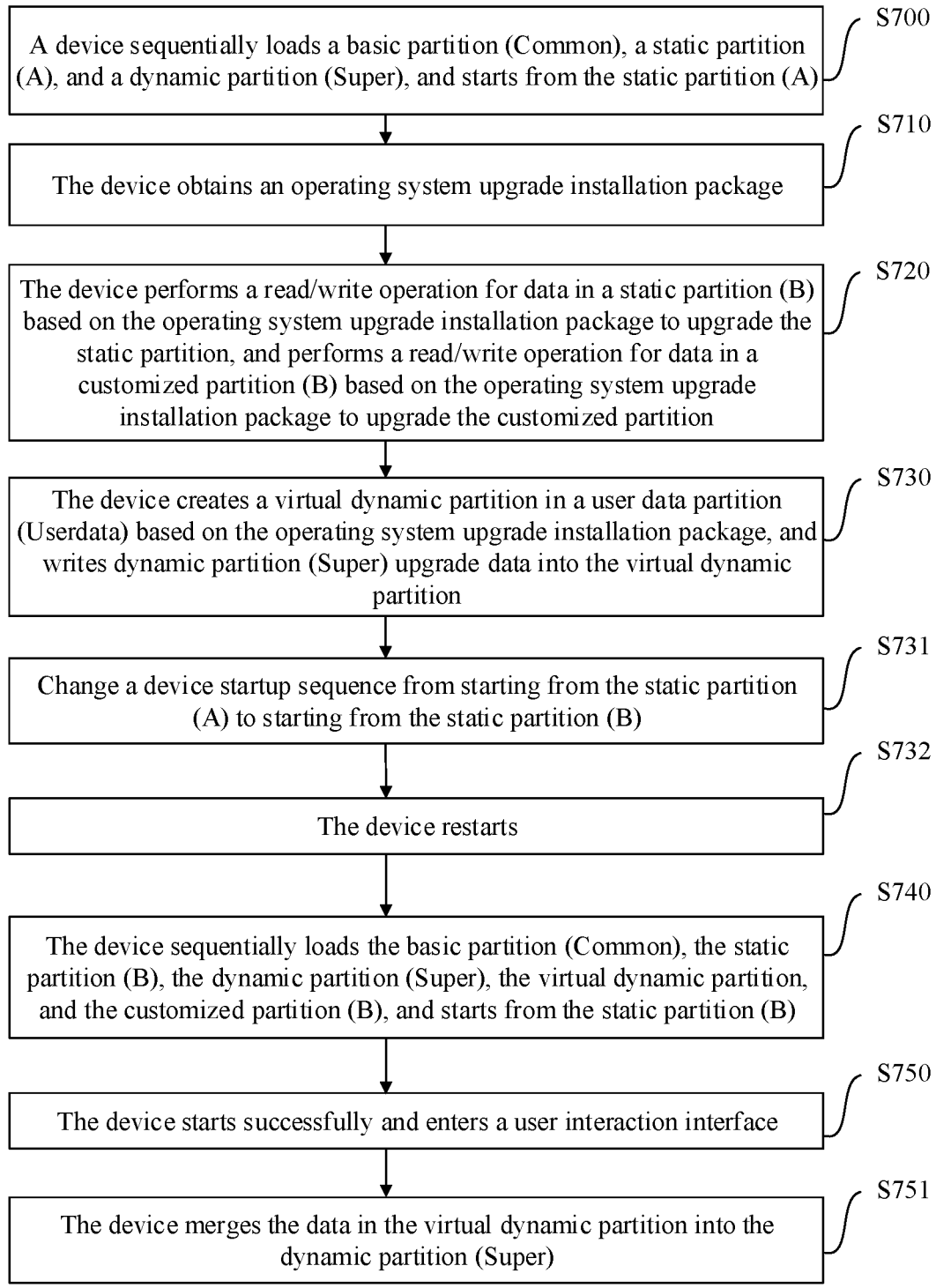
FIG. 7 is a flowchart of operating system upgrade according to an embodiment of this application.

FIG. 7 is a flowchart of operating system upgrade for the system storage structure shown in FIG. 6. When the device currently starts from the static partition (A), the device upgrades the operating system according to a procedure shown in FIG. 7.

S700: The device sequentially loads the basic partition (Common), the static partition (A), the dynamic partition (Super), and the customized partition (A), and starts from the static partition (A).

S710: The device obtains an operating system upgrade installation package, where the operating system upgrade installation package includes static partition upgrade data, dynamic partition (Super) upgrade data, and customized partition upgrade data. For a process of obtaining the operating system upgrade installation package, refer to S510.

S720: The device performs a read/write operation for data in the static partition (B) based on the operating system upgrade installation package to upgrade the static partition, and performs a read/write operation for data in the customized partition (B) based on the operating system upgrade installation package to upgrade the customized partition.

Specifically, the device writes the static partition upgrade data into the static partition (B), and writes the customized partition upgrade data into the customized partition (B). For details, refer to S520.

S730: The device creates a virtual dynamic partition in the user data partition (Userdata) based on the operating system upgrade installation package, and writes the dynamic partition (Super) upgrade data into the virtual dynamic partition. For details, refer to S530.

In S720, data operations of static partition upgrade and customized partition upgrade are for operating system data in the static partition (B) and the customized partition (B), and does not affect operating system data in the currently started static partition (A) and customized partition (A). In addition, in S730, a data operation of dynamic partition upgrade is completed in the virtual dynamic partition created in the user data partition (Userdata), and does not affect the currently loaded dynamic partition (Super). Therefore, in an entire operating system upgrade process, a user can use the device normally. Further, for the dynamic partition (Super), the virtual dynamic partition is created in the user data partition (Userdata) only when upgrade needs to be performed. After upgrade is completed, the created virtual dynamic partition may be deleted from the user data partition. Therefore, data storage space utilization is effectively improved.

S731: Change a device startup sequence from starting from the static partition (A) to starting from the static partition (B). Specifically, a startup identifier in the common partition is rewritten, to rewrite the startup identifier from A to B.

S732: The device restarts. The current operating system is exited, the device is powered off, and the device is powered on again.

After S731, the device does not need to restart immediately, but the user may autonomously select a restart occasion (freely select an occasion for performing S732). In this way, the operating system upgrade process does not affect a normal mobile phone operation of the user. This greatly improves user experience.

S740: The device sequentially loads the basic partition (Common), the static partition (B), the dynamic partition (Super), the virtual dynamic partition, and the customized partition (B), and starts from the static partition (B). For details, refer to S540 and S541.

S750: The device starts successfully and enters a user interaction interface.

S751: The device merges the data in the virtual dynamic partition into the dynamic partition (Super). For details, refer to S551.

Based on the solution shown in FIG. 6 and FIG. 7, although senseless upgrade can be performed when the terminal device normally runs a customized operating system, when the terminal device is normally used, in a non-upgrade state, data in only one of the customized partition (A) and the customized partition (B) is used, and the other partition is idle. As a result, data storage space utilization is low, and data storage space that can be freely used by the user is greatly reduced. Therefore, in a solution of another embodiment of this application, a customized partition is integrated into a dynamic partition (Super), and the customized partition becomes a sub-partition of the dynamic partition (Super). During operating system upgrade, the customized partition is upgraded synchronously when the dynamic partition (Super) is upgraded based on a virtual partition solution.

Figure 8:
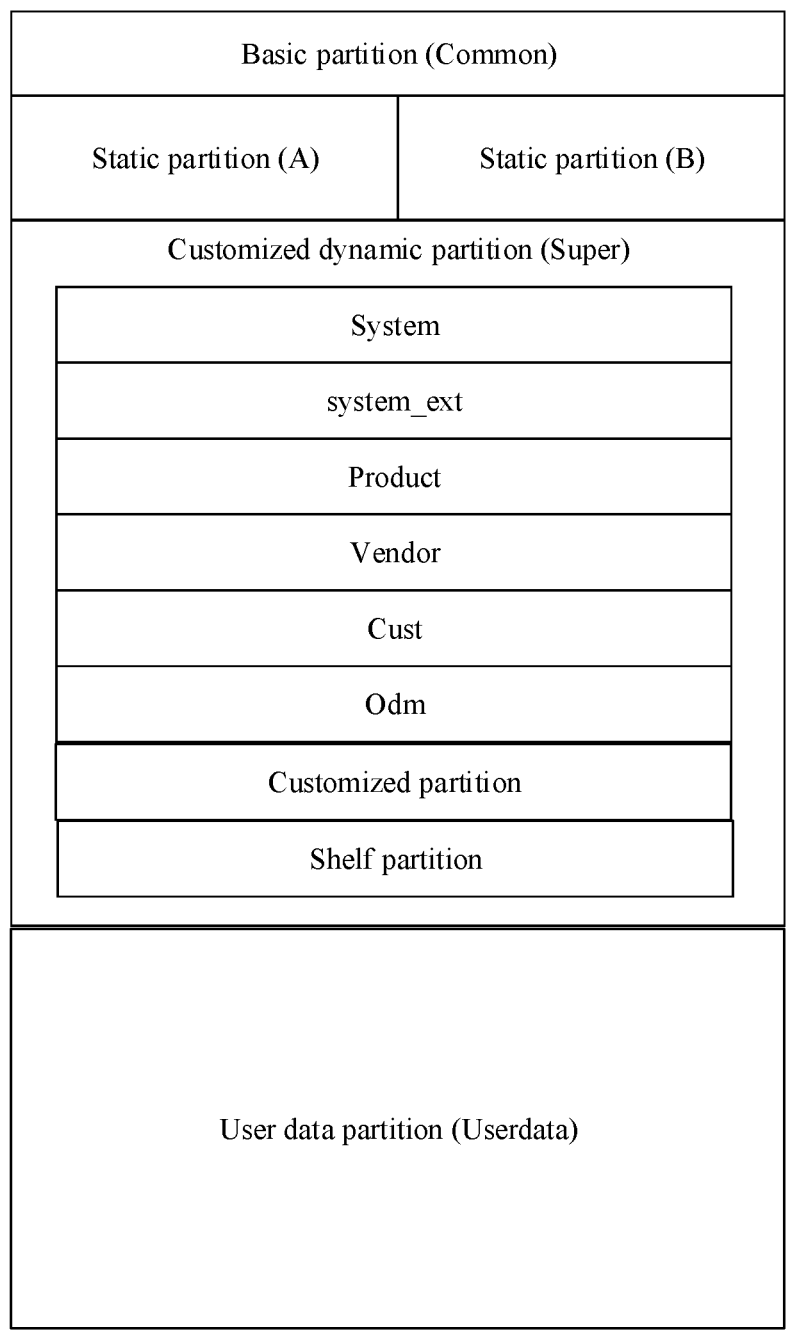
FIG. 8 is a schematic diagram of a data storage structure according to an embodiment of this application.

FIG. 8 is a schematic diagram of a data storage structure according to an embodiment of this application. As shown in FIG. 8, a data storage area of an Android system includes a basic partition (Common), a static partition (A), a static partition (B), a customized dynamic partition (Super), and a user data partition (Userdata). For specific sub-partitions included in the static partition (A) and the static partition (B), refer to related descriptions of the embodiment shown in FIG. 2. The customized dynamic partition (Super) includes all sub-partitions in the dynamic partition of the basic operating system shown in FIG. 4. In addition, customized data is added to the dynamic partition in a form of a sub-partition of the dynamic partition. As shown in FIG. 8, the customized dynamic partition (Super) further includes a customized partition and a shelf partition (the customized partition and the shelf partition are used to store customized data). The customized partition and the shelf partition are sub-partitions of the customized dynamic partition (Super). Therefore, an entire customized operating system (basic data+customized data) may be upgraded in the virtual A/B upgrade manner shown in FIG. 5.

It should be noted herein that in the embodiment shown in FIG. 8, the customized data is stored in the customized partition and the shelf partition. In another embodiment of this application, the customized data may alternatively be stored in another partition structure. For example, only the customized partition is reserved or only the shelf partition is reserved. For another example, an additional service partition is added.

Further, in a virtual A/B upgrade solution, a differential upgrade manner is used for the dynamic partition (Super). During upgrade, a virtual dynamic partition in the user data partition (Userdata) stores not all files of a dynamic partition (Super) with an upgraded new version, but an upgrade result that is of data to be upgraded in the dynamic partition (Super) with an old version and that is obtained after upgrade.

Figure 9A:
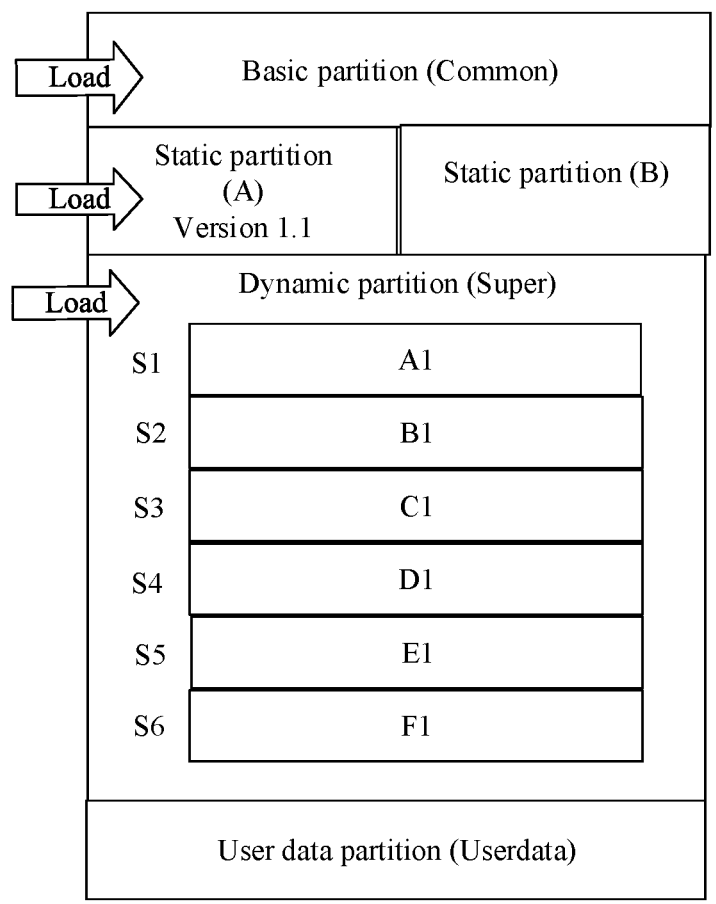
FIG. 9a to FIG. 9d are a schematic logical diagram of operating system upgrade according to an embodiment of this application.

FIG. 9a to FIG. 9d are a schematic logical diagram of operating system upgrade according to an embodiment of this application. As shown in FIG. 9a, it is assumed that data in a dynamic partition (Super) can be divided into six parts: S1, S2, S3, S4, S5, and S6. A version of an operating system is 1.1 before operating system upgrade. In the operating system with the version 1.1, data in S1, S2, S3, S4, S5, and S6 is respectively A1, B1, C1, D1, E1, and F1. The operating system needs to be upgraded from the version 1.1 to a version 1.2. In the operating system with the version 1.2, data in the data groups S1, S2, S3, S4, S5, and S6 is respectively A1, B2, C1, D2, E1, and F1. In other words, only data groups S2 and S4 in the dynamic partition (Super) are upgraded from the version 1.1 to the version 1.2.

Figure 10:
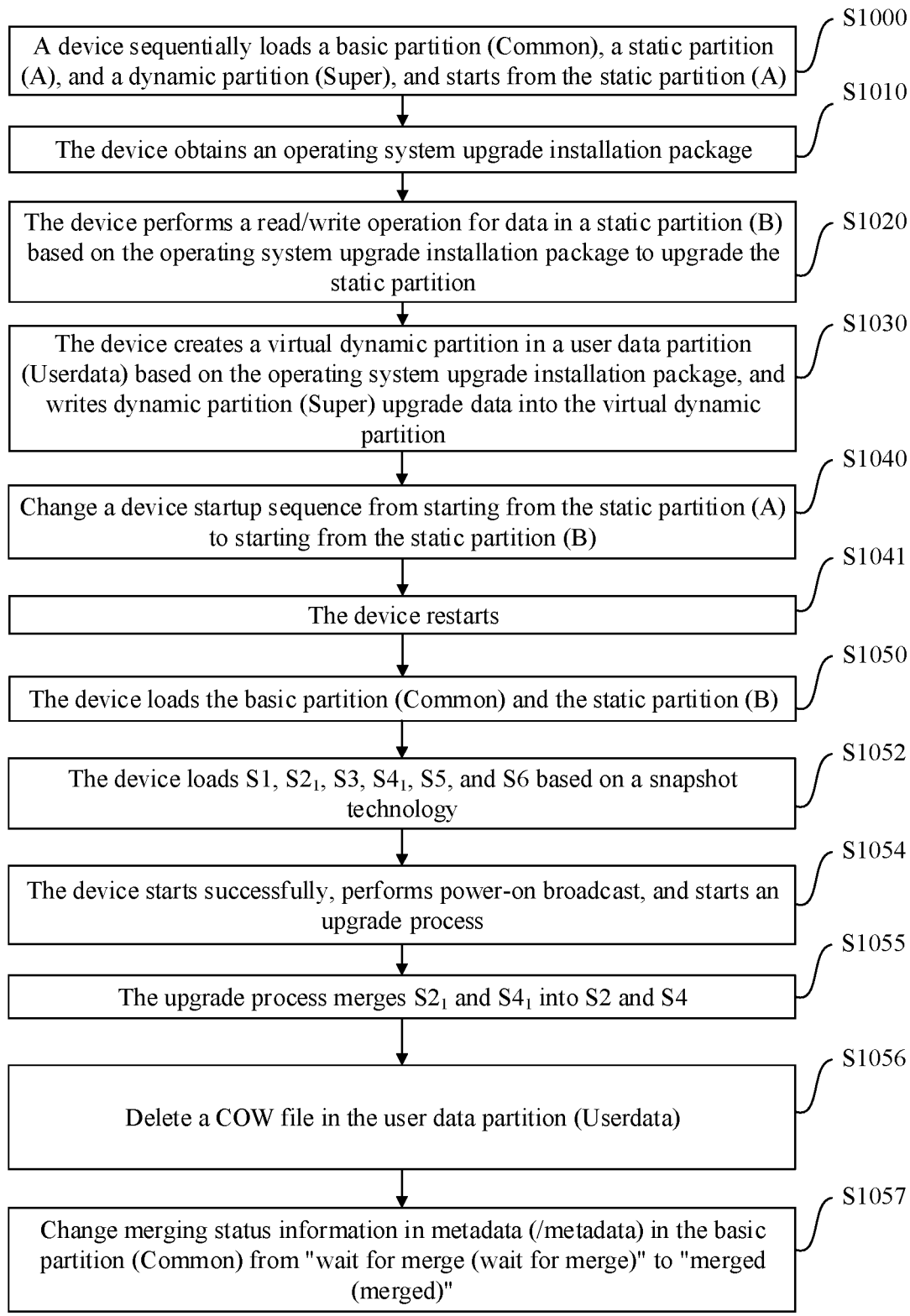
FIG. 10 is a schematic diagram of a data storage structure according to an embodiment of this application.

FIG. 10 is a flowchart of operating system upgrade for a mobile phone storage structure in the embodiment shown in FIG. 9a. When the device currently starts from the static partition (A), the device upgrades the operating system according to a procedure shown in FIG. 10.

S1000: The device sequentially loads the basic partition (Common), the static partition (A), and the dynamic partition (Super), and starts from the static partition (A), as shown in FIG. 9a.

S1010: The device obtains an operating system upgrade installation package, where the system upgrade installation package includes a static partition upgrade file and a dynamic partition upgrade file. For details, refer to S510.

S1020: The device performs a read/write operation for data in the static partition (B) based on the operating system upgrade installation package to upgrade the static partition. For details, refer to S520.

Figure 9B:
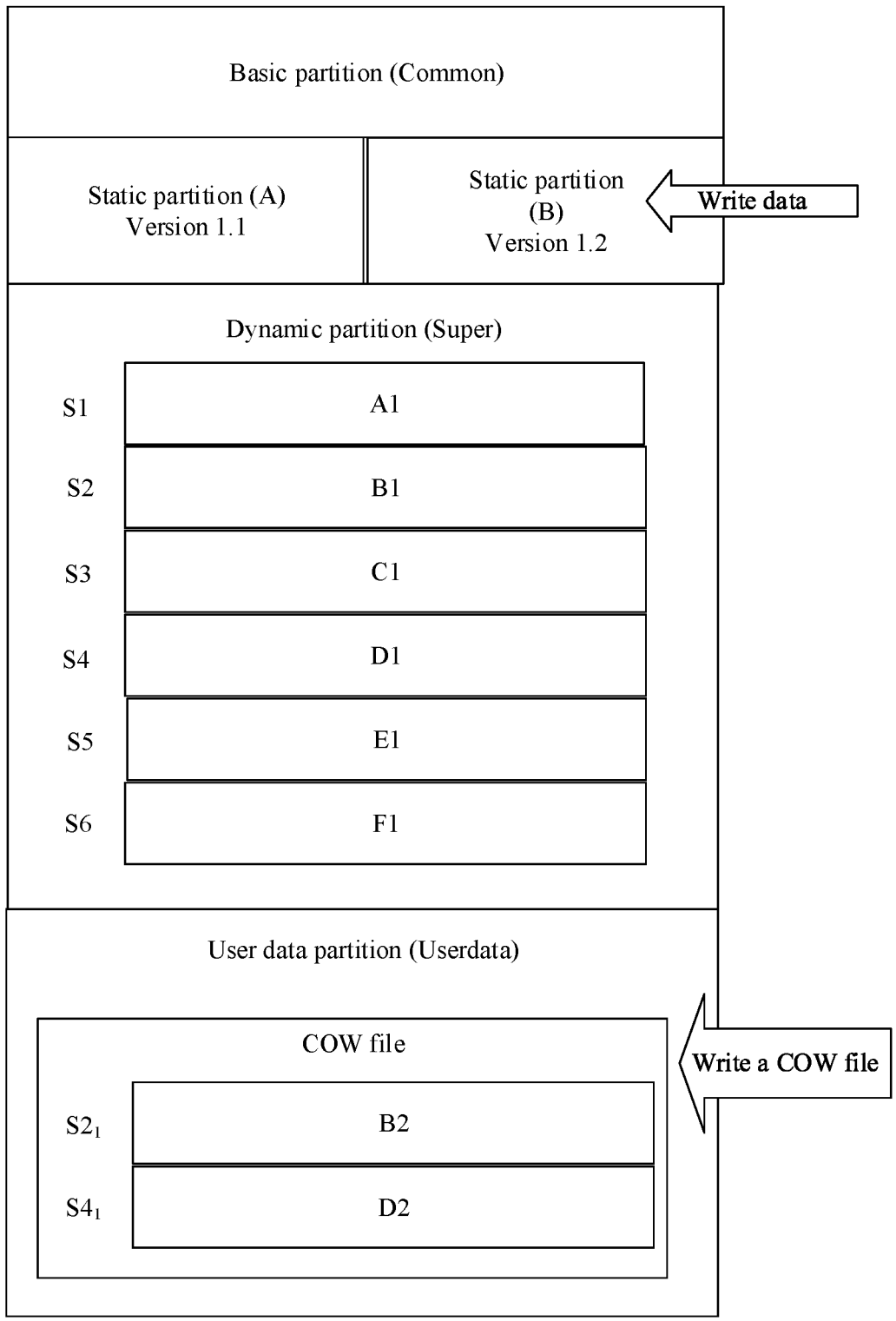

Specifically, as shown in FIG. 9b, a static partition file with the version 1.2 is extracted from the operating system upgrade installation package, and the static partition file with the version 1.2 is written into the static partition (B).

S1030: The device creates a virtual dynamic partition in the user data partition (Userdata) based on the operating system upgrade installation package, and writes dynamic partition (Super) upgrade data into the virtual dynamic partition. For details, refer to S530.

Specifically, in this embodiment, the upgrade data for the dynamic partition (Super) in the operating system upgrade installation package is directional, and is not full data of the dynamic partition (Super) but upgrade data B2 and D2 that point to S2 and S4. The data written into the virtual dynamic partition is $S2_1$ and $S4_1$ corresponding to the data groups S2 and S4, and files stored in $S2_1$ and $S4_1$ are respectively B2 and D2.

For example, in the operating system upgrade installation package, it is assumed that the upgrade data for the dynamic partition (Super) is named $S2_1$ and $S4_1$. $S2_1$ and S2 are corresponding to each other in terms of names, and $S4_1$ and S4 are corresponding to each other in terms of names (it is pre-specified that names that are consistent after a subscript is removed have a mutual correspondence). Therefore, when reading $S2_1$ and $S4_1$, the device may determine that $S2_1$ and $S4_1$ are upgrade files of S2 and S4.

Further, as shown in FIG. 9b, in the virtual dynamic partition, a snapshot (snapshot) technology is used, and $S2_1$ and $S4_1$ are stored by using a copy-on-write (Copy-On-Write, COW) file.

Specifically, a process of creating the virtual dynamic partition includes the following.

The COW file corresponding to $S2_1$ and $S4_1$ is stored in the user data partition (Userdata).

Specifically, a hash value of $S1+S2_1+S3+S4_1+S5+S6$ is calculated, and whether the hash value is consistent with a hash value that is of the dynamic partition (Super) with the version 1.2 and that is stored in the operating system upgrade installation package is determined.

If the hash values are inconsistent, the upgrade procedure is interrupted and an error is reported.

If the hash values are consistent, merging status information in metadata (/metadata) in the basic partition (Common) is changed from "merged (merged)" to "wait for merge (wait for merge)".

S1040: Change a device startup sequence from starting from the static partition (A) to starting from the static partition (B). Specifically, a startup identifier in the common partition is rewritten, to rewrite the startup identifier from A to B.

S1041: The device restarts. The current operating system is exited, the device is powered off, and the device is powered on again.

Figure 9C:
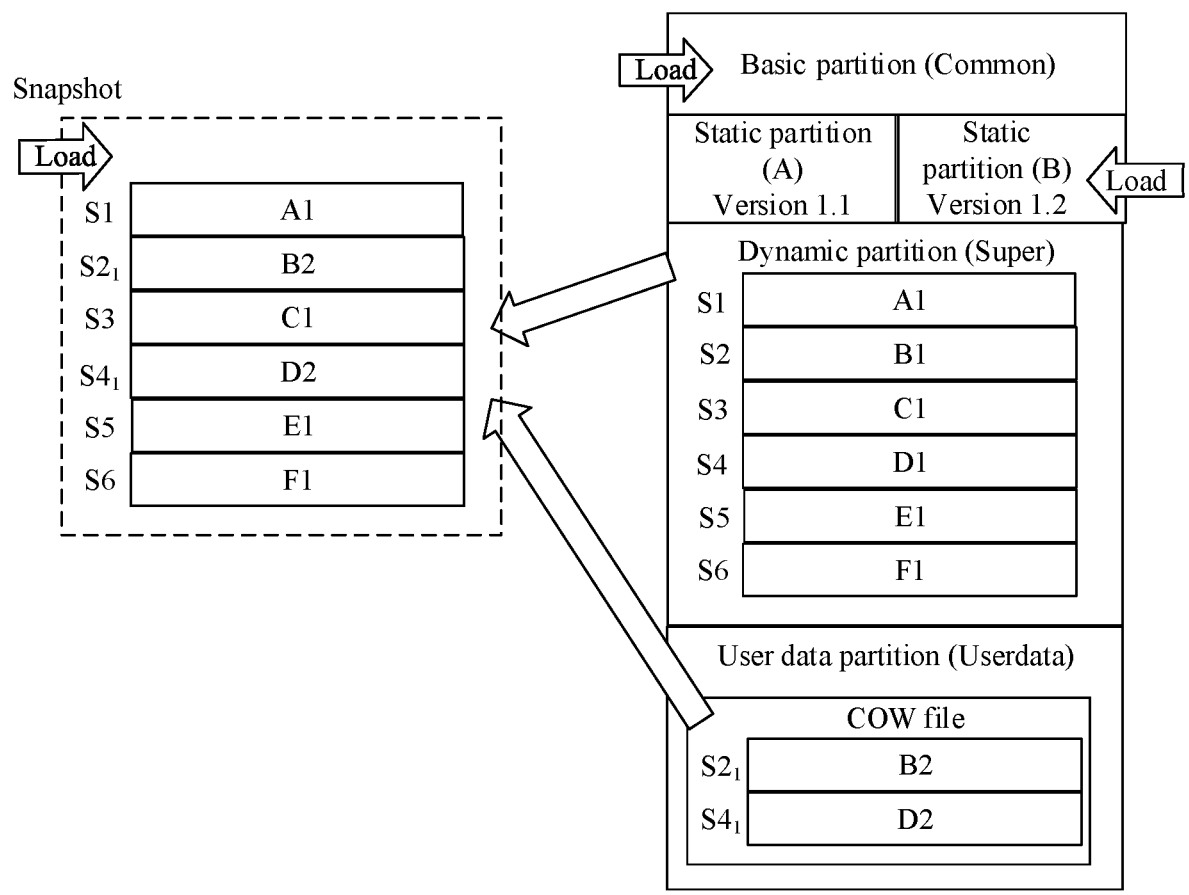

S1050: The device loads the basic partition (Common) and the static partition (B), as shown in FIG. 9c.

S1053: As shown in FIG. 9c, the device loads S1, $S2_1$, S3, $S4_1$, S5, and S6 based on the snapshot technology. For details, refer to S541.

S1054: The device starts successfully, performs power-on broadcast, and starts an upgrade process.

S1055: The upgrade process starts merging (merge) to merge $S2_1$ and $S4_1$ into S2 and S4. Specifically, B2 is written into S2, and D2 is written into S4.

After the merging (merge) is completed, the six data groups S1, S2, S3, S4, S5, and S6 in the dynamic partition (Super) are respectively A1, B2, C1, D2, E1, and F1. The dynamic partition (Super) is upgraded to the version 1.2.

S1056: Delete the COW file in the user data partition (Userdata).

S1057: Change the merging status information in the metadata (/metadata) in the basic partition (Common) from "wait for merge (wait for merge)" to "merged (merged)".

Figure 9D:
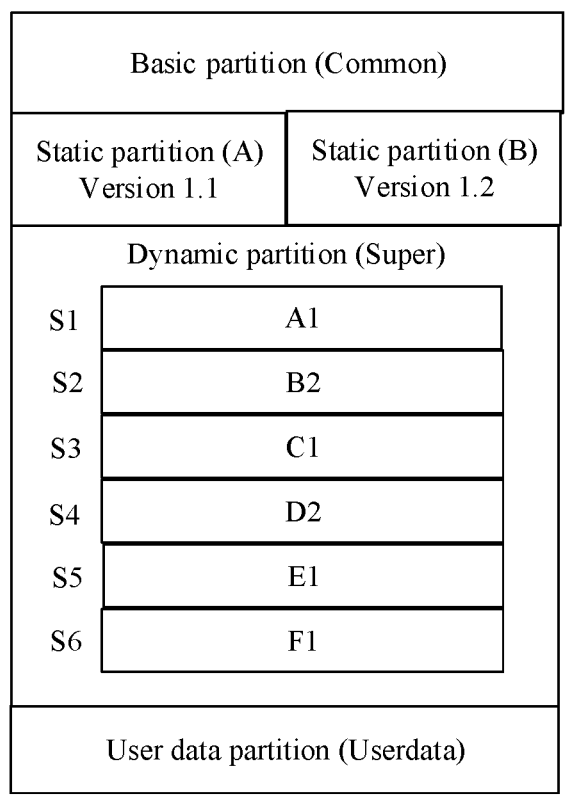

For specific execution of S1054 to S1057, refer to S550 and S551. A final status of an operating system file on the device is shown in FIG. 9d.

Specifically, in the embodiment shown in FIG. 9, division into S1, S2, S3, S4, S5, and S6 is merely a theoretical example for description. A person skilled in the art may set division of the dynamic partition (Super) according to an actual requirement. For example, division is performed based on a sub-partition, and the dynamic partition (Super) is upgraded by using a sub-partition as a unit. For another example, one sub-partition is divided into a plurality of sub-parts, and partial data upgrade is performed on the sub-partition.

Based on the embodiments in FIG. 9 and FIG. 10, when the dynamic partition (Super) is upgraded, one sub-partition (a first sub-partition) or a plurality of sub-partitions (for example, a first sub-partition and a second sub-partition) of the dynamic partition (Super) may be upgraded, and overall upgrade does not need to be performed for the dynamic partition (Super). With reference to the embodiment shown in FIG. 8, the customized partition (first sub-partition) and the shelf partition (second sub-partition) are sub-partitions of the customized dynamic partition (Super). Therefore, when only the customized partition and/or the shelf partition need/needs to be upgraded, based on the procedure in the embodiments in FIG. 9 and FIG. 10, only the customized partition and/or the shelf partition may be upgraded when the customized dynamic partition (Super) is upgraded, and overall upgrade does not need to be performed for the customized dynamic partition (Super).

The following uses a customized partition as an upgrade target to describe, by using a specific embodiment, an upgrade execution procedure of performing independent upgrade for the customized partition.

In an application scenario, independent upgrade is performed for a customized partition of a customized operating system, a static partition does not need to be upgraded, and only the customized partition needs to be upgraded in a customized dynamic partition (Super). To be specific, S1020 in the embodiment in FIG. 10 is not performed. In addition, in S1030, the COW file in the virtual dynamic partition is upgrade file data of the customized partition.

Further, after S1030, the device needs to restart (S1040), and a startup partition after the device restarts is switched. To be specific, if the device starts from the static partition (A) before the restart, the device starts from the static partition (B) after the restart.

When data in the static partition (A) is consistent with data in the static partition (B), in a case in which S1020 in the embodiment in FIG. 10 is not performed, if the device can successfully load the static partition (A) and start from the static partition (A) before the restart, the device can also successfully load the static partition (B) and start from the static partition (B) after the restart.

Figure 11:
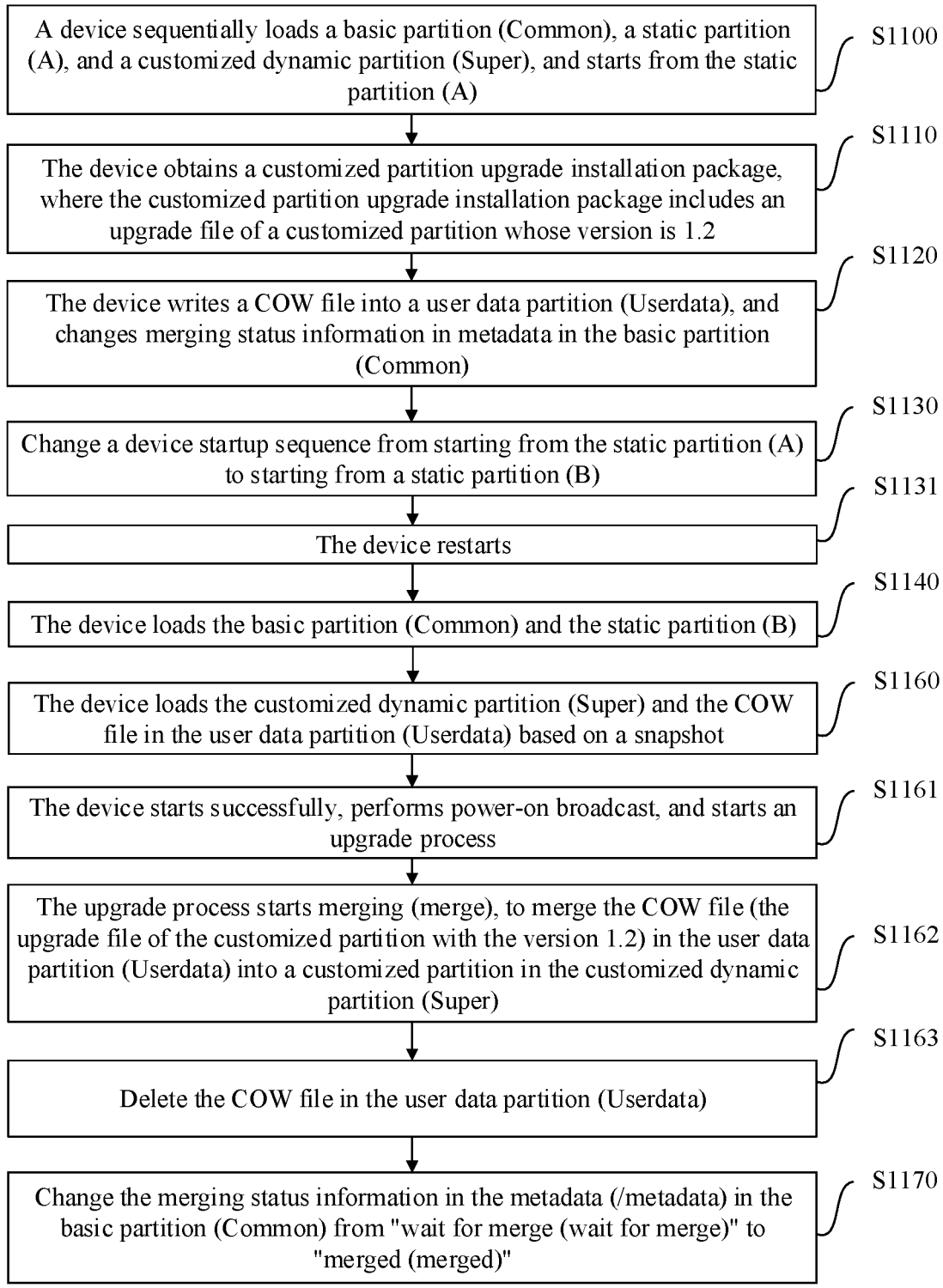
FIG. 11 is a flowchart of upgrade execution of performing independent upgrade on a customized partition according to an embodiment of this application.

FIG. 11 shows an upgrade execution procedure of performing independent upgrade for a customized partition. The data in the static partition (A) is consistent with the data in the static partition (B). When the device currently starts from the static partition (A), the device implements independent upgrade of the customized partition according to the procedure shown in FIG. 11.

S1100: The device sequentially loads the basic partition (Common), the static partition (A), and the customized dynamic partition (Super), and starts from the static partition (A). It is assumed that a current version of the customized partition in the customized dynamic partition (Super) is 1.1.

S1110: The device obtains a customized partition upgrade installation package, where the customized partition upgrade installation package includes an upgrade file of a customized partition whose version is 1.2. In this embodiment, the customized partition upgrade installation package is directional, and includes only upgrade data (a first upgrade file) of the customized partition (a first sub-partition). Therefore, data is not written into a static partition when operating system upgrade is performed based on the customized partition upgrade installation package.

S1120: The device writes a COW file into the user data partition (Userdata), where the COW file includes the upgrade file of the customized partition whose version is 1.2; and the device modifies merging status information in metadata (/metadata) in the basic partition (Common). For a specific implementation of S1120, refer to S530 and S1030.

S1130: Change a device startup sequence from starting from the static partition (A) to starting from the static partition (B). Specifically, a startup identifier in the common partition is rewritten, to rewrite the startup identifier from A to B.

S1131: The device restarts. The current operating system is exited, the device is powered off, and the device is powered on again.

S1140: The device loads the basic partition (Common) and the static partition (B).

S1160: The device loads the customized dynamic partition (Super) and the COW file in the user data partition (Userdata) based on a snapshot. For details, refer to S541 and S1053.

S1161: The device starts successfully, performs power-on broadcast, and starts an upgrade process.

S1162: The upgrade process starts merging (merge), to merge the COW file (the upgrade file of the customized partition with the version 1.2) in the user data partition (Userdata) into the customized partition in the customized dynamic partition (Super).

S1163: Delete the COW file in the user data partition (Userdata).

S1170: Change the merging status information in the metadata (/metadata) in the basic partition (Common) from "wait for merge (wait for merge)" to "merged (merged)".

For specific execution of S1161 to S1070, refer to S550 and S551.

According to the method in embodiments of this application, independent upgrade may be performed on a customized sub-partition in a dynamic partition, to upgrade a customized operating system. According to the method in embodiments of this application, a data amount of an operating system upgrade installation package can be effectively reduced, and an operating system upgrade procedure can be simplified.

In some application scenarios, data associated with data in a customized partition is stored in a static partition. For example, the associated data may be a check code for the customized partition that is stored in the static partition. The check code is used to check the customized partition during normal use of the device, to prevent the data in the customized partition from being tampered with. Therefore, when independent upgrade is performed on the customized partition, the associated data in the static partition needs to be updated.

Figure 12A:
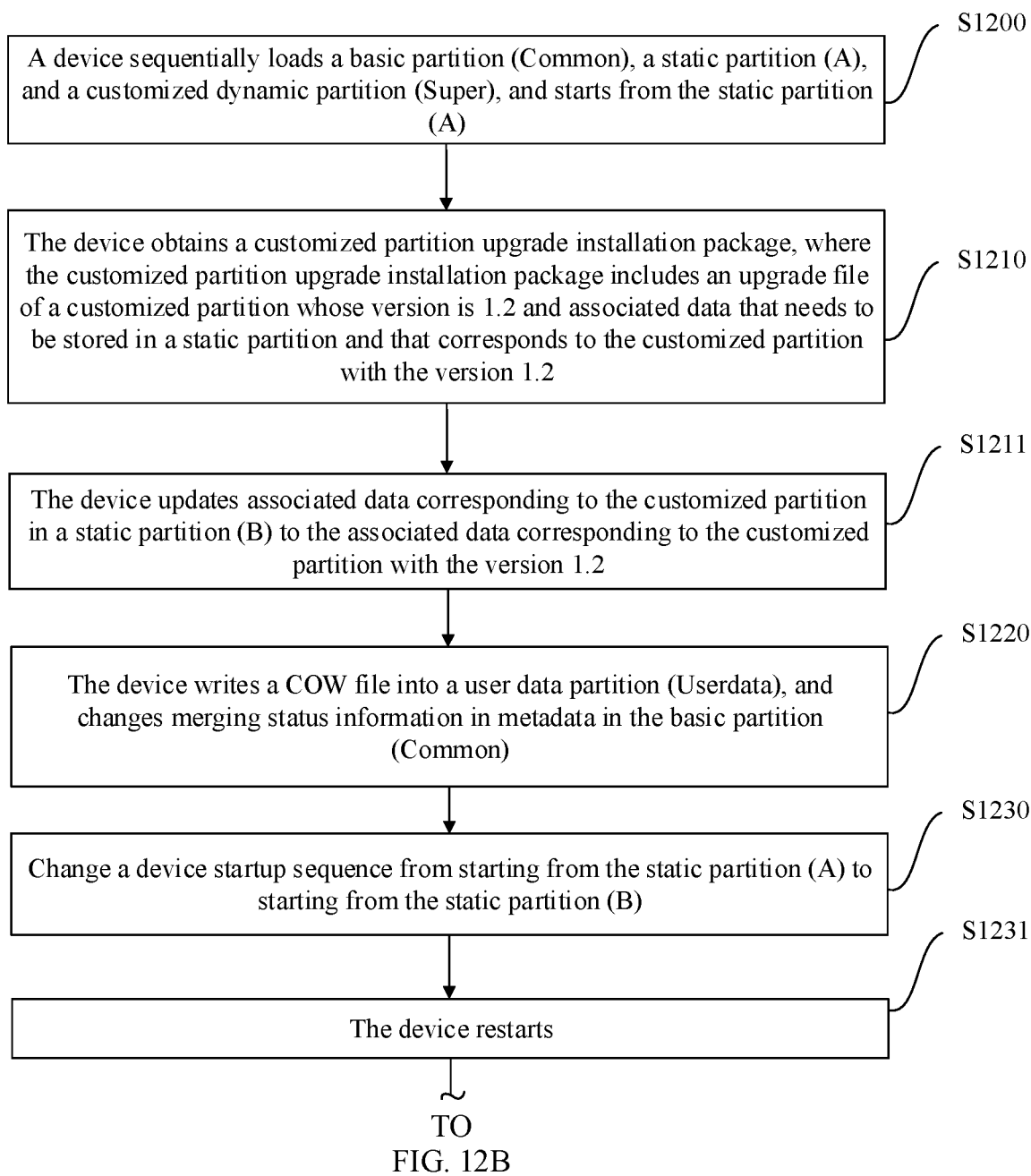
FIG. 12A and FIG. 12B are a flowchart of upgrade execution of performing independent upgrade on a customized partition according to an embodiment of this application.
Figure 12B:
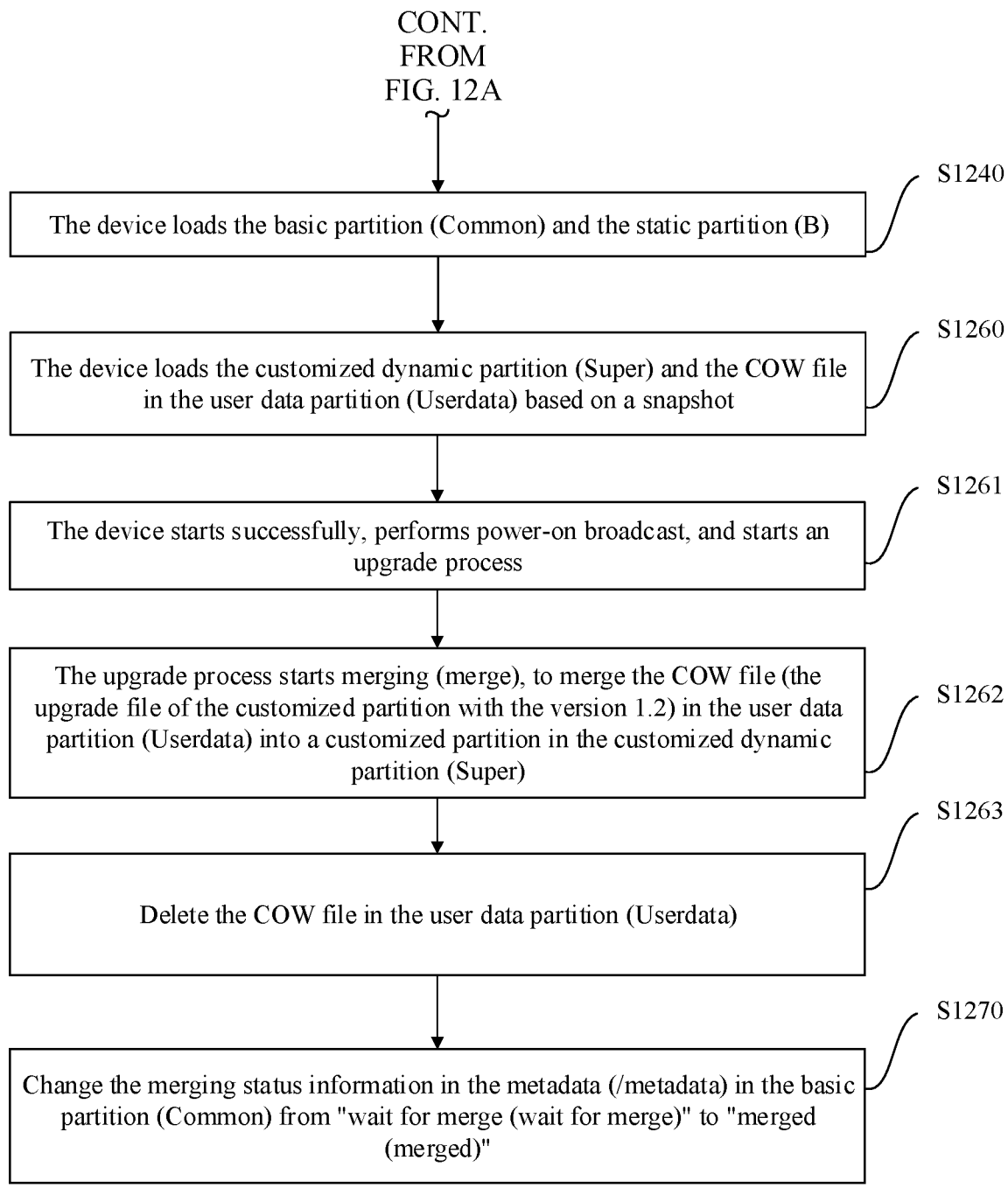

FIG. 12A and FIG. 12B show an upgrade execution procedure of performing independent upgrade for a customized partition. If the data in the static partition (A) is consistent with the data in the static partition (B), when the device currently starts from the static partition (A), the device implements independent upgrade of the customized partition according to the procedure shown in FIG. 12A and FIG. 12B.

S1200: The device sequentially loads the basic partition (Common), the static partition (A), and the customized dynamic partition (Super), and starts from the static partition (A). It is assumed that a current version of the customized partition in the customized dynamic partition (Super) is 1.1.

S1210: The device obtains a customized partition upgrade installation package, where the customized partition upgrade installation package includes an upgrade file of a customized partition whose version is 1.2 and associated data that needs to be stored in a static partition and that corresponds to the customized partition with the version 1.2.

S1211: The device updates associated data corresponding to the customized partition in the static partition (B) to the associated data corresponding to the customized partition with the version 1.2.

For S1220 to S1270, refer to S1120 to S1170.

In some application scenarios, after the device performs operating system upgrade based on the procedure shown in FIG. 5 or FIG. 10, a version difference exists between the static partition (B) and the static partition (A), and the data in the static partition (A) may be inconsistent with the data in the static partition (B). In this case, if the device can start from the static partition (B) currently, the device may not be able to start from the static partition (A) after the restart.

Figure 13A:
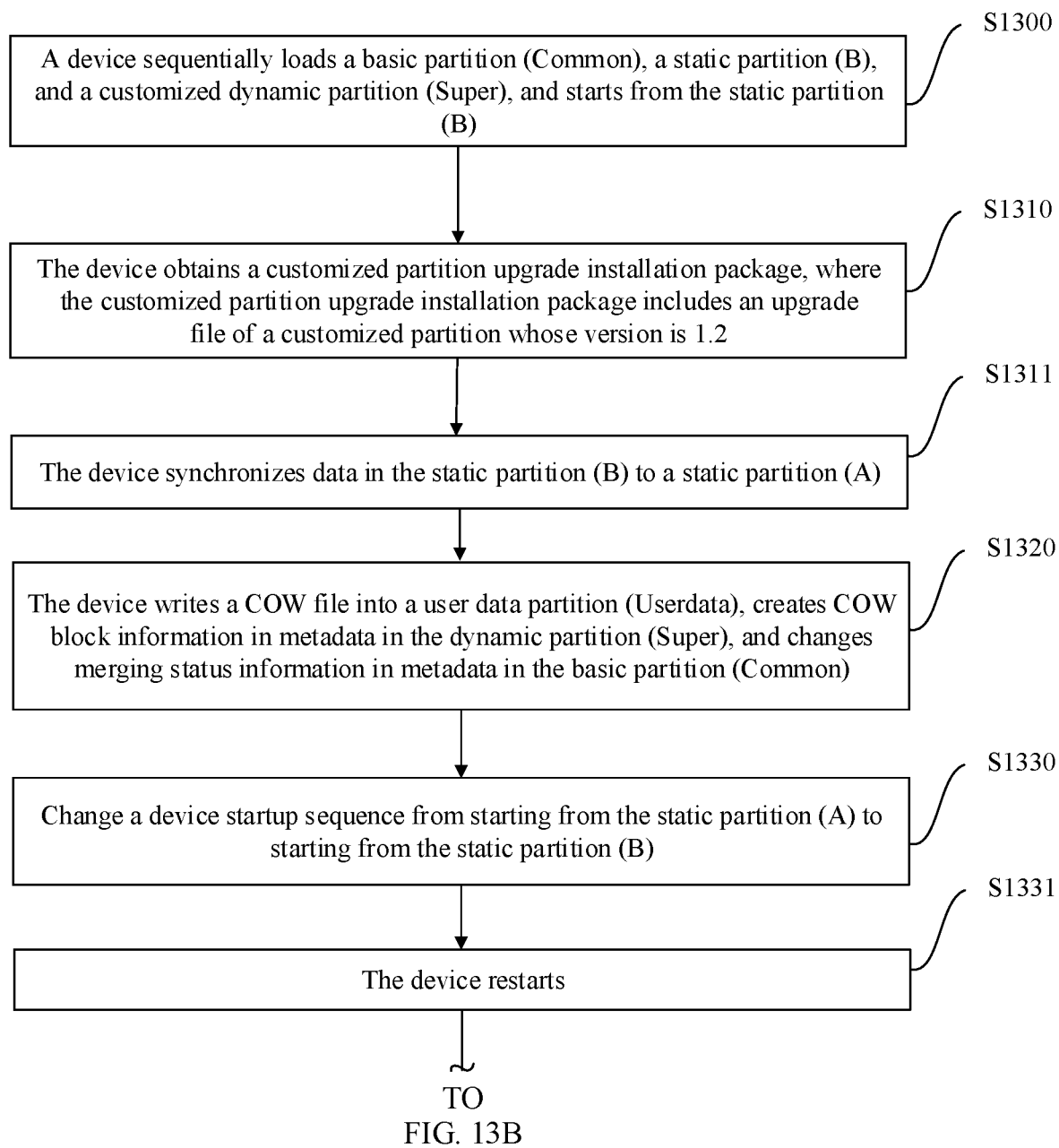
FIG. 13A and FIG. 13B are a flowchart of upgrade execution of performing independent upgrade on a customized partition according to an embodiment of this application.
Figure 13B:
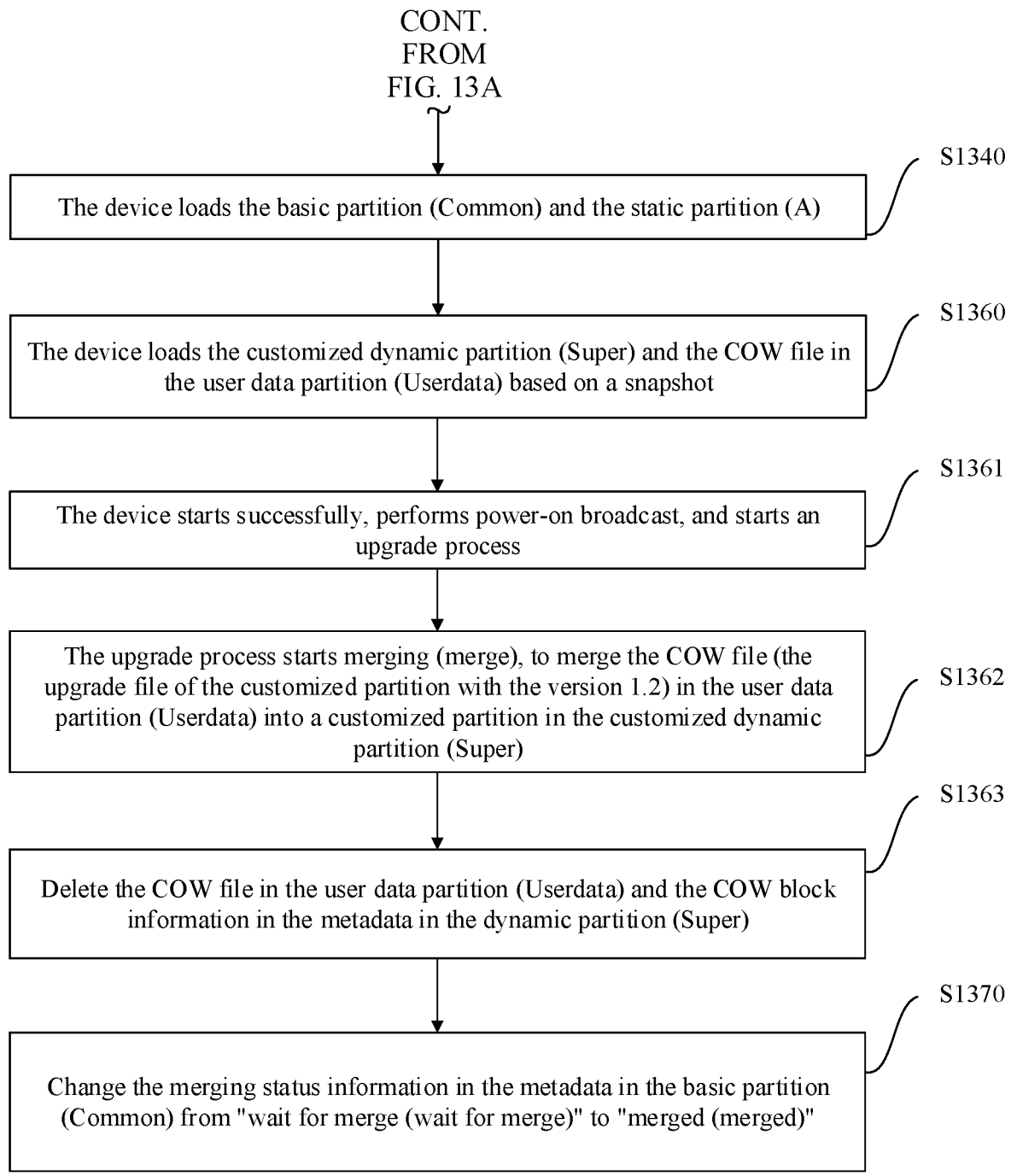

FIG. 13A and FIG. 13B show an upgrade execution procedure of performing independent upgrade on a customized partition. After the device starts from the static partition (A), the device performs operating system upgrade based on the procedure shown in FIG. 5 or FIG. 10, and starts from the static partition (B) to complete the operating system upgrade. Then, in a state in which the device starts from the static partition (B), the device implements independent upgrade of the customized partition according to a procedure shown in FIG. 13A and FIG. 13B.

S1300: The device sequentially loads the basic partition (Common), the static partition (B), and the customized dynamic partition (Super), and starts from the static partition (B). It is assumed that a current version of the customized partition in the customized dynamic partition (Super) is 1.1.

S1310: The device obtains a customized partition upgrade installation package, where the customized partition upgrade installation package includes an upgrade file of a customized partition whose version is 1.2.

S1311: The device synchronizes data in the static partition (B) to the static partition (A).

For S1320 to S1370, refer to S1120 to S1170. A difference is that in S1340, the device loads the static partition (A).

Further, a specific implementation of S1311 is not specifically limited in this application, and a person skilled in the art may implement S1311 in a plurality of feasible implementations. The following uses a specific embodiment as an example to describe a specific implementation procedure of S1311.

In S520, the device writes the data in the static partition in the operating system upgrade installation package into the static partition (B). Therefore, if the same operating system upgrade installation package is used, the data in the static partition in the operating system upgrade installation package is written into the static partition (A), so that the data in the static partition (A) is consistent with the data in the static partition (B).

Therefore, in an application scenario, S1311 includes: Obtain the operating system upgrade installation package that is stored in S510 and that is read from the user data partition (Userdata), and write the data in the static partition in the operating system upgrade installation package into the static partition (A).

The static partition (A) is completely consistent with the static partition (B) in terms of partition structure and partition size. Therefore, the data in the static partition (A) may be directly mirrored to the static partition (B), or the data in the static partition (B) may be directly mirrored to the static partition (A).

Figure 14:
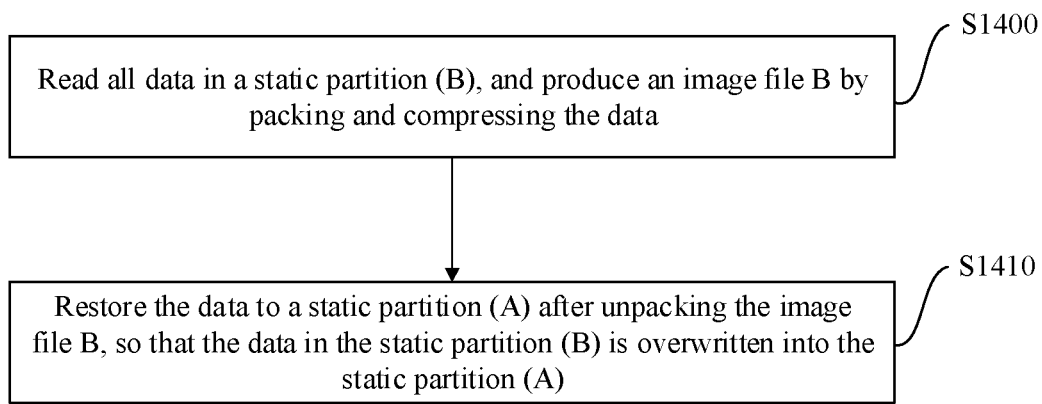
FIG. 14 is a flowchart of static partition synchronization according to an embodiment of this application.

FIG. 14 is a flowchart of an implementation of S1311. The terminal device performs the following procedure shown in FIG. 14 to implement S1311.

S1400: Read all data in the static partition (B), and produce an image file B by packing and compressing the data.

S1410: Restore the data to the static partition (A) after unpacking the image file B, so that the data in the static partition (B) is overwritten into the static partition (A).

The static partition (A) and the static partition (B) are consistent in terms of partition structure, and include a same sub-partition. Therefore, the data in the static partition (B) can be synchronized to the static partition (A) by overwriting a file in each sub-partition in the static partition (B) into a corresponding sub-partition in the static partition (A).

Figure 15A:
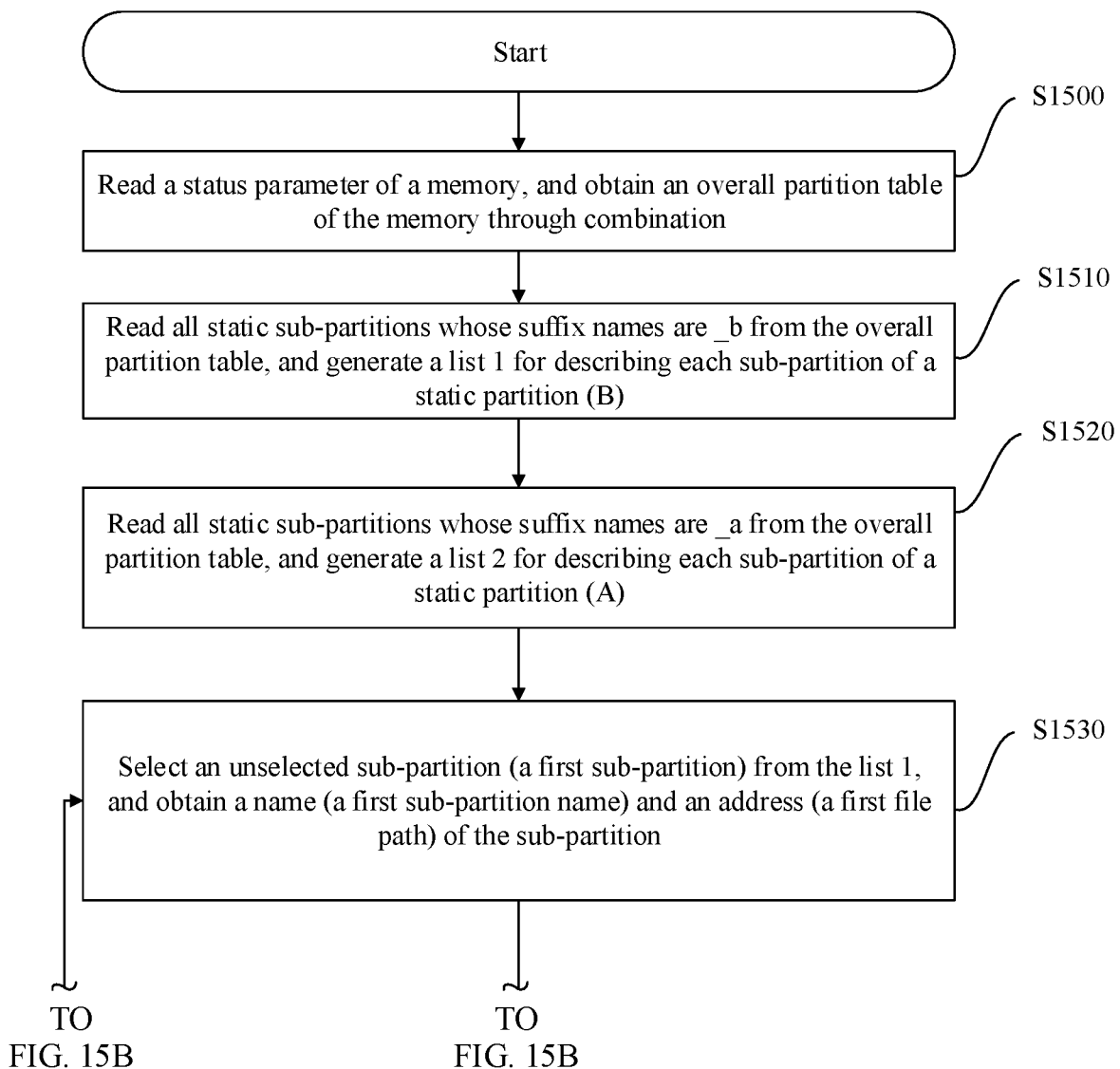
FIG. 15A and FIG. 15B are a flowchart of static partition synchronization according to an embodiment of this application.
Figure 15B:
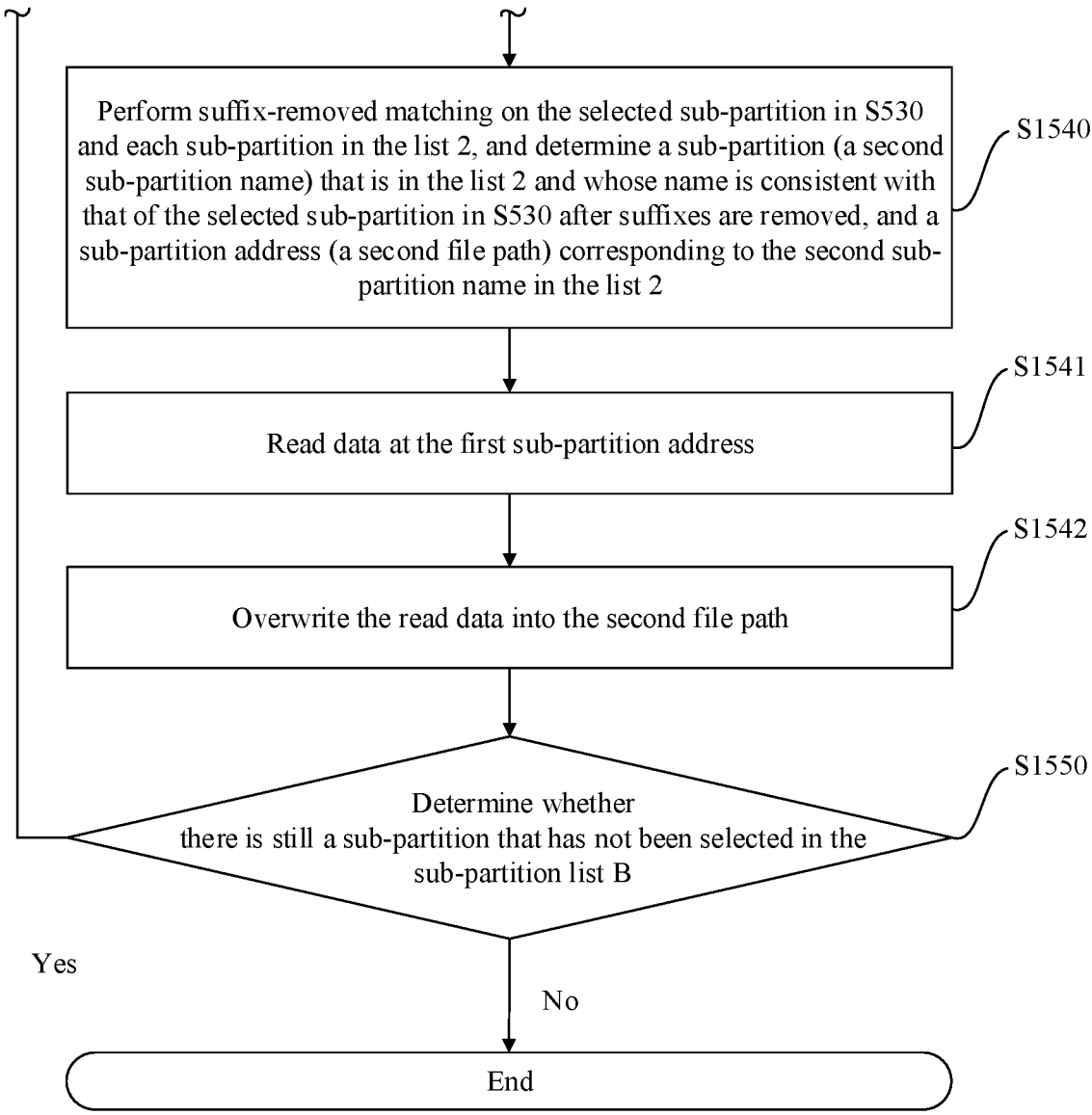

FIG. 15A and FIG. 15B are a flowchart of an implementation of S1311. The terminal device performs the following procedure shown in FIG. 15A and FIG. 15B to implement S1311.

S1500: Read a parameter that is in a memory of the device and that is related to a partition table (the parameter is pre-stored in the device before delivery of the device), and obtain an overall partition table of the memory through combination.

For example, an address mapping description of each partition in/dev/block/by-name/is read, and address mapping of all partitions is integrated into an overall partition table.

For another example, a partition table stored in an MBR is read.

S1510: Read all static sub-partitions whose suffix names are _b from the overall partition table, and generate a list 1 for describing each sub-partition of the static partition (B), where the list 1 includes a name and an address of each sub-partition of the static partition (B). An example is as follows:

TABLE 1

| Number | Sub-partition name | Sub-partition address (file path) | Selected state |
|---|---|---|---|
| 1 | bootloader_b | /dev/block/by-name/bootloader_b | 0 |
| 2 | boot_b | /dev/block/by-name/boot_b | 0 |
| 3 | vendor_boot_b | /dev/block/by-name/vendor_boot_b | 0 |
| 4 | dtbo_b | /dev/block/by-name/dtbo_b | 0 |
| 5 | vbmeta_b | /dev/block/by-name/vbmeta_b | 0 |

S1520: Read all static sub-partitions whose suffix names are _a from the overall partition table, and generate a list 2 for describing each sub-partition of the static partition (A), where the list 2 includes a name and an address of each sub-partition of the static partition (A). An example is as follows:

TABLE 2

| Number | Sub-partition name | Sub-partition address (file path) |
|---|---|---|
| 1 | bootloader_a | /dev/block/by-name/bootloader_a |
| 2 | boot_a | /dev/block/by-name/boot_a |
| 3 | vendor_boot_a | /dev/block/by-name/vendor_boot_a |
| 4 | dtbo_a | /dev/block/by-name/dtbo_a |
| 5 | vbmeta_a | /dev/block/by-name/vbmeta_a |

It should be noted herein that, in Table 1 and Table 2, the address of the sub-partition is represented in a file path manner. In an actual application scenario, a person skilled in the art may describe the address of the sub-partition in a plurality of different manners. For example, a linear address is used for description.

S1530: Select an unselected sub-partition (a first sub-partition) from the list 1, and obtain a name (a first sub-partition name) and an address (a first file path) of the sub-partition.

Specifically, before S1530, none of sub-partitions in the list 1 is selected. In S1530, sub-partitions may be sequentially selected based on an arrangement sequence (number sequence) of the sub-partitions in the list 1, or may be randomly selected from all unselected sub-partitions.

Further, after a sub-partition is selected, the sub-partition is marked to subsequently determine whether the sub-partition has been selected. For example, as shown in Table 1, a selected state column is added to Table 1, and an initial value of the selected state is 0. If the sub-partition is selected, the selected state is changed to 1.

S1540: Perform suffix-removed matching on the selected sub-partition in S1530 and each sub-partition in the list 2, and determine a sub-partition (a second sub-partition name) that is in the list 2 and whose name is consistent with that of the selected sub-partition in S1530 after suffixes are removed, and a sub-partition address (a second file path) corresponding to the second sub-partition name in the list 2.

S1541: Read data in the first file path.

S1542: Overwrite the read data into the second file path.

S1550: Determine whether there is still a sub-partition that has not been selected in the list 1.

If there is a sub-partition that has not been selected in the list 1, step S1530 is performed to reselect a first sub-partition.

If there is no sub-partition that has not been selected in the list 1, static partition synchronization ends.

Table 1 and Table 2 are used as examples. In an application scenario, the device performs the following procedure:

The $1^{st}$ sub-partition whose selected state is 0 in Table 1 (the sub-partition bootloader_b with a number 1) is selected, and the selected state of the number 1 is changed to 1.

Suffix-removed matching is performed in all sub-partition names in Table 2 by using bootloader_b. Because bootloader_a is consistent with bootloader_b after _a and _b are removed, bootloader_a is obtained through matching according to bootloader_b.

A file path/dev/block/by-name/bootloader_b corresponding to bootloader_b is read from Table 1.

A file path/dev/block/by-name/bootloader_a corresponding to bootloader_a is read from Table 2.

Data in/dev/block/by-name/bootloader_b is read, and the read data is overwritten into /dev/block/by-name/bootloader_a.

There is still a sub-partition whose selected state is 0 in Table 1. The 1st sub-partition whose selected state is 0 in Table 1 (the sub-partition boot_b with a number 2) is selected, and the selected state of the number 2 is changed to 1.

Suffix-removed matching is performed in all sub-partition names in Table 2 by using boot_b. Because boot_a is consistent with boot_b after _a and _b are removed, boot_a is obtained through matching according to boot_b.

A file path/dev/block/by-name/boot_b corresponding to boot_b is read from Table 1.

A file path/dev/block/by-name/boot_a corresponding to boot_a is read from Table 2.

Data in/dev/block/by-name/boot_b is read, and the read data is overwritten into /dev/block/by-name/boot_a.

There is still a sub-partition whose selected state is 0 in Table 1. The $1^{st}$ sub-partition whose selected state is 0 in Table 1 (the sub-partition vendor_boot_b with a number 3) is selected, and the selected state of the number 3 is changed to 1.

Suffix-removed matching is performed in all sub-partition names in Table 2 by using vendor_boot_b. Because vendor_boot_a is consistent with vendor_boot_b after _a and _b are removed, vendor_boot_a is obtained through matching according to vendor_boot_b.

A file path/dev/block/by-name/vendor_boot_b corresponding to vendor_boot_b is read from Table 1.

A file path/dev/block/by-name/vendor_boot_a corresponding to vendor_boot_a is read from Table 2.

Data in/dev/block/by-name/vendor_boot_b is read, and the read data is overwritten into/dev/block/by-name/vendor_boot_a.

There is still a sub-partition whose selected state is 0 in Table 1. The $1^{st}$ sub-partition whose selected state is 0 in Table 1 (the sub-partition dtbo_b with a number 4) is selected, and the selected state of the number 4 is changed to 1.

Suffix-removed matching is performed in all sub-partition names in Table 2 by using dtbo_b. Because dtbo_a is consistent with dtbo_b after _a and _b are removed, dtbo_a is obtained through matching according to dtbo_b.

A file path/dev/block/by-name/dtbo_b corresponding to dtbo_b is read from Table 1.

A file path/dev/block/by-name/dtbo_a corresponding to vendor_boot_a is read from Table 2.

Data in/dev/block/by-name/dtbo_b is read, and the read data is overwritten into /dev/block/by-name/dtbo_a.

There is still a sub-partition whose selected state is 0 in Table 1. The $1^{st}$ sub-partition whose selected state is 0 in Table 1 (the sub-partition vbmeta_b with a number 5) is selected, and the selected state of the number 5 is changed to 1.

Suffix-removed matching is performed in all sub-partition names in Table 2 by using vbmeta_b. Because vbmeta_a is consistent with vbmeta_b after _a and _b are removed, vbmeta_a is obtained through matching according to vbmeta_b.

A file path/dev/block/by-name/vbmeta_b corresponding to vbmeta_b is read from Table 1.

A file path/dev/block/by-name/vbmeta_a corresponding to vendor_boot_a is read from Table 2.

Data in/dev/block/by-name/vbmeta_b is read, and the read data is overwritten into /dev/block/by-name/vbmeta_a.

There is no sub-partition whose selected state is 0 in Table 1, and static partition synchronization is completed.

Further, in the foregoing solution, Table 1 and Table 2 are transition data, and Table 1 and Table 2 are deleted after static partition synchronization is completed.

In an operating system upgrade process, in S520, when a read/write operation is performed on the data in the static partition (B) based on the operating system upgrade installation package, not all sub-partitions in the static partition (B) may be rewritten. To be specific, if the data in the static partition (A) and the data in the static partition (B) are completely consistent before operating system upgrade, after the operating system is upgraded according to the procedure shown in FIG. 5, data in some sub-partitions in the static partition (A) and the static partition (B) may still be consistent. Therefore, in a process of synchronizing the data in the static partition (B) to the static partition (A), if sub-partitions with inconsistent data in the static partition (B) and the static partition (A) are first identified, and only the sub-partitions with inconsistent data are synchronized, a data read/write amount can be greatly reduced while implementing data consistency.

Figure 16A:
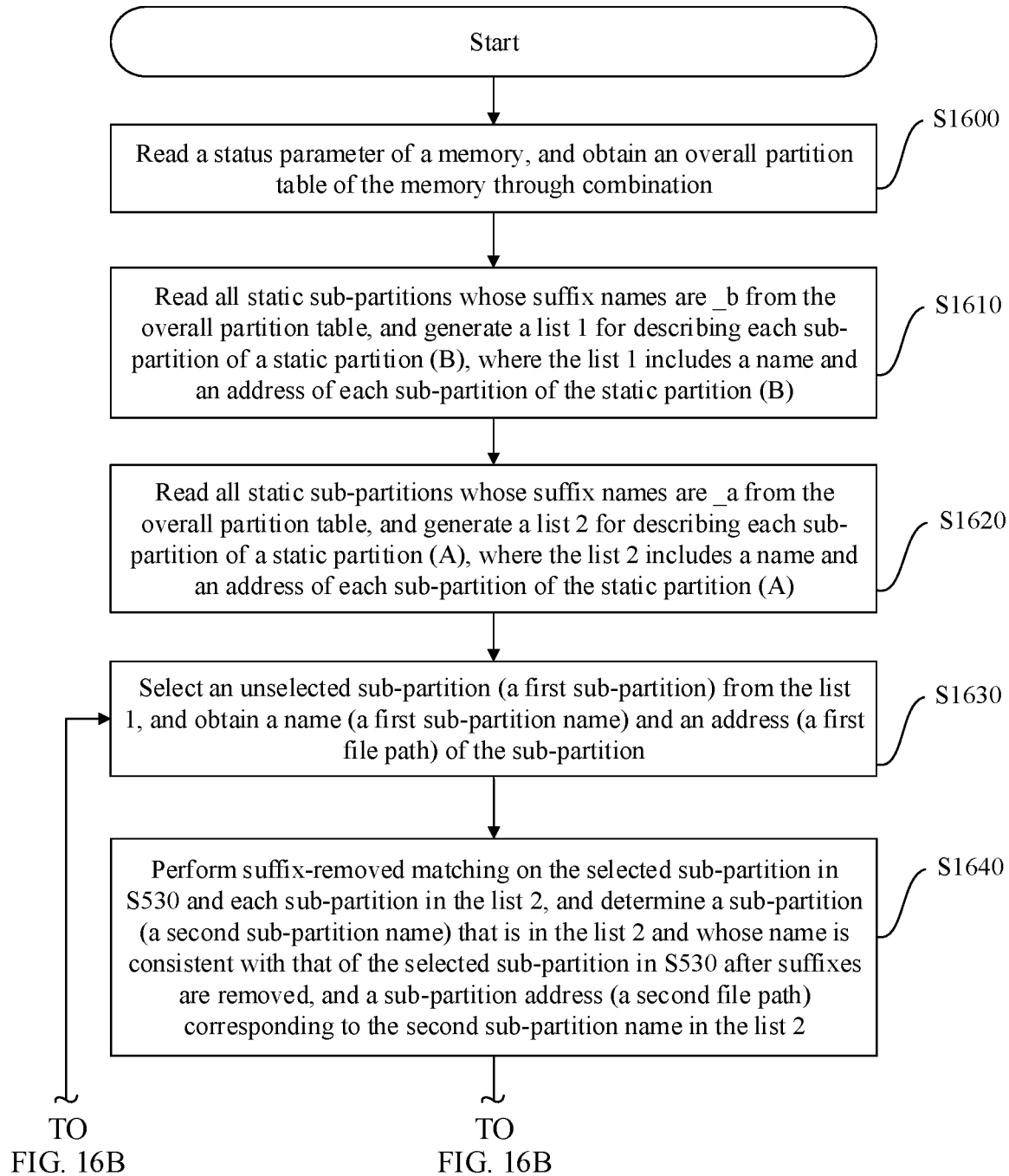
FIG. 16A and FIG. 16B are a flowchart of static partition synchronization according to an embodiment of this application.
Figure 16B:
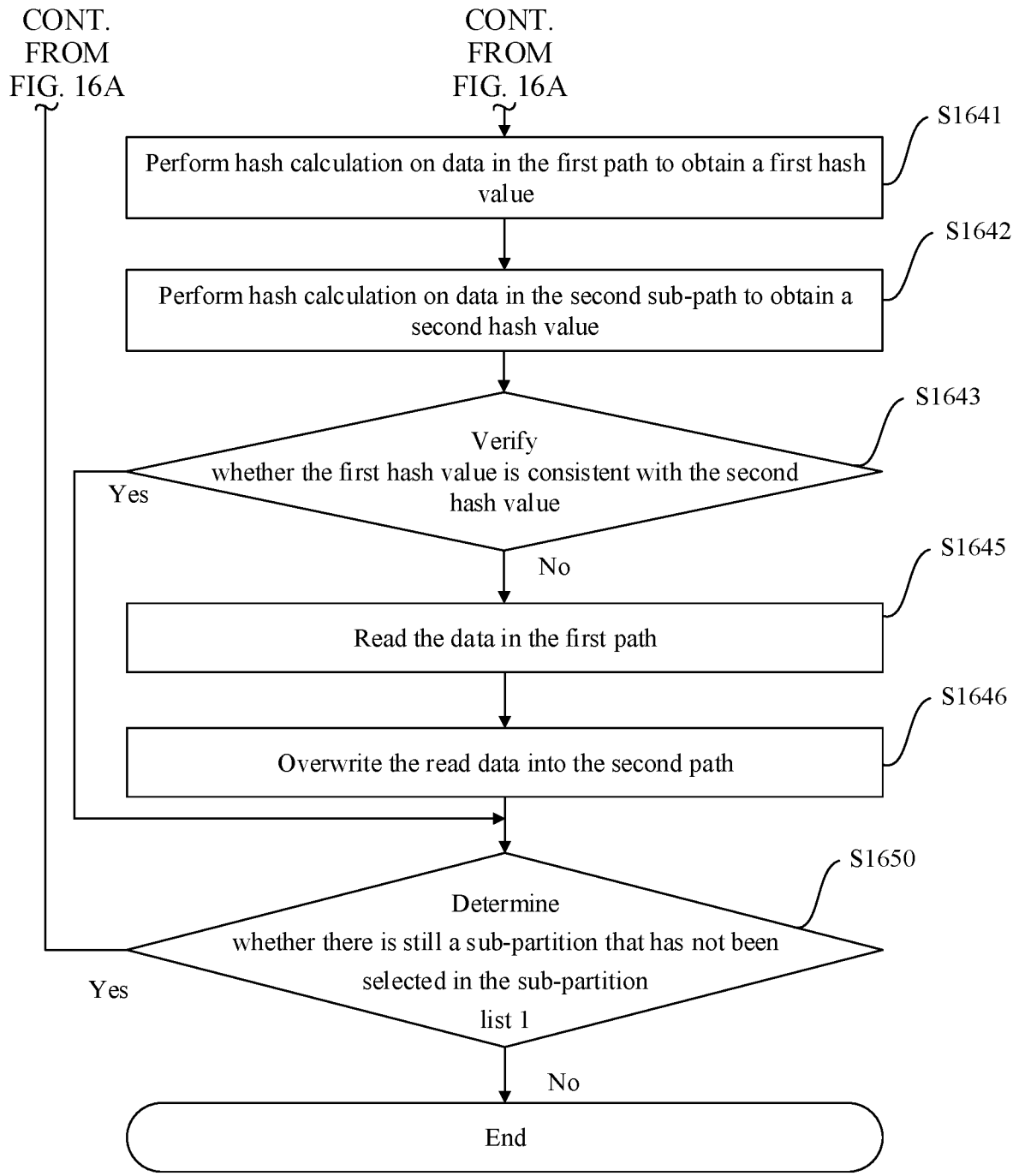

FIG. 16A and FIG. 16B are a flowchart of an implementation of S1311. The terminal device performs the following procedure shown in FIG. 16A and FIG. 16B to implement S1311.

For S1610 to S1640, refer to S1510 to S1540.

S1641: Perform hash calculation on data in the first path to obtain a first hash value.

S1642: Perform hash calculation on data in the second sub-path to obtain a second hash value.

S1643: Verify whether the first hash value is consistent with the second hash value.

If the first hash value is consistent with the second hash value, S1650 is performed.

If the first hash value is inconsistent with the second hash value, S1645 is performed: Read the data in the first path.

S1646: Overwrite the read data into the second path.

For S1650, refer to S1550.

If there is a sub-partition that has not been selected in the list 1, step S1630 is performed to reselect a first sub-partition.

If there is no sub-partition that has not been selected in the list 1, static partition synchronization ends.

Further, in the solution of this application, after an execution node that performs data synchronization between the static partition (A) and the static partition (B) writes upgrade data into either of the static partition (A) and the static partition (B), an execution time node of S1311 is not limited to being after S1310.

Specifically, after S520, the upgrade data is written into the static partition (B). However, in this case, because the static partition (A) is loaded to run the operating system, the data in the static partition (B) cannot be synchronized to the static partition (A). After S531, in an execution process of S540, the device loads the static partition (B) to run the operating system, and running of the operating system does not require loading of the static partition (A). In this case, the data in the static partition (B) can be synchronized to the static partition (A). Therefore, in this embodiment of this application, S1311 may be performed at any moment after S531. This application sets no specific limitation on an execution time sequence of S1311. A person skilled in the art may set, according to an actual requirement, a static partition synchronization moment or a trigger condition for triggering static partition synchronization. The following describes another execution time sequence of S1311 by using a specific embodiment as an example.

Figure 17A:
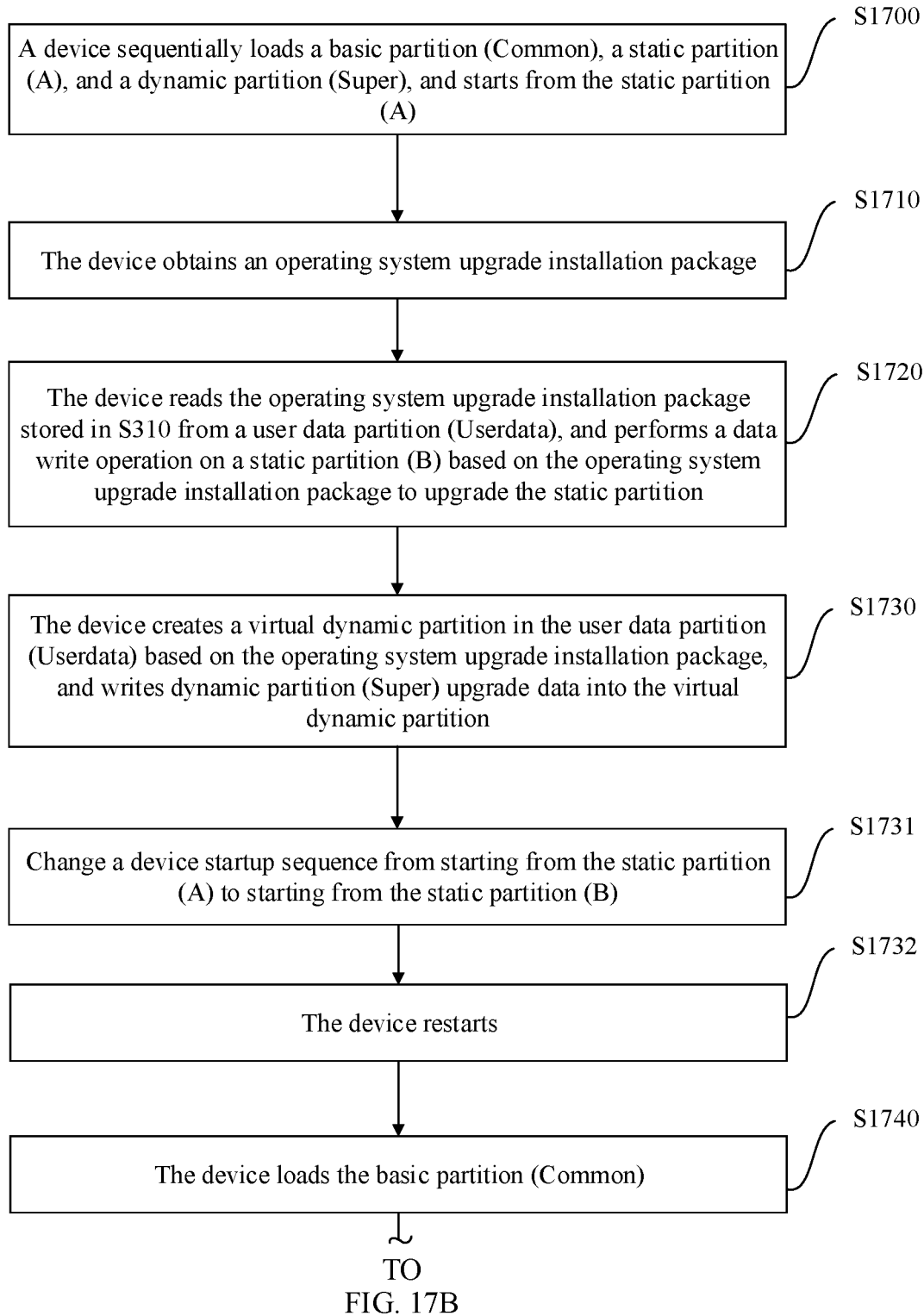
FIG. 17A and FIG. 17B are a flowchart of operating system upgrade according to an embodiment of this application.
Figure 17B:
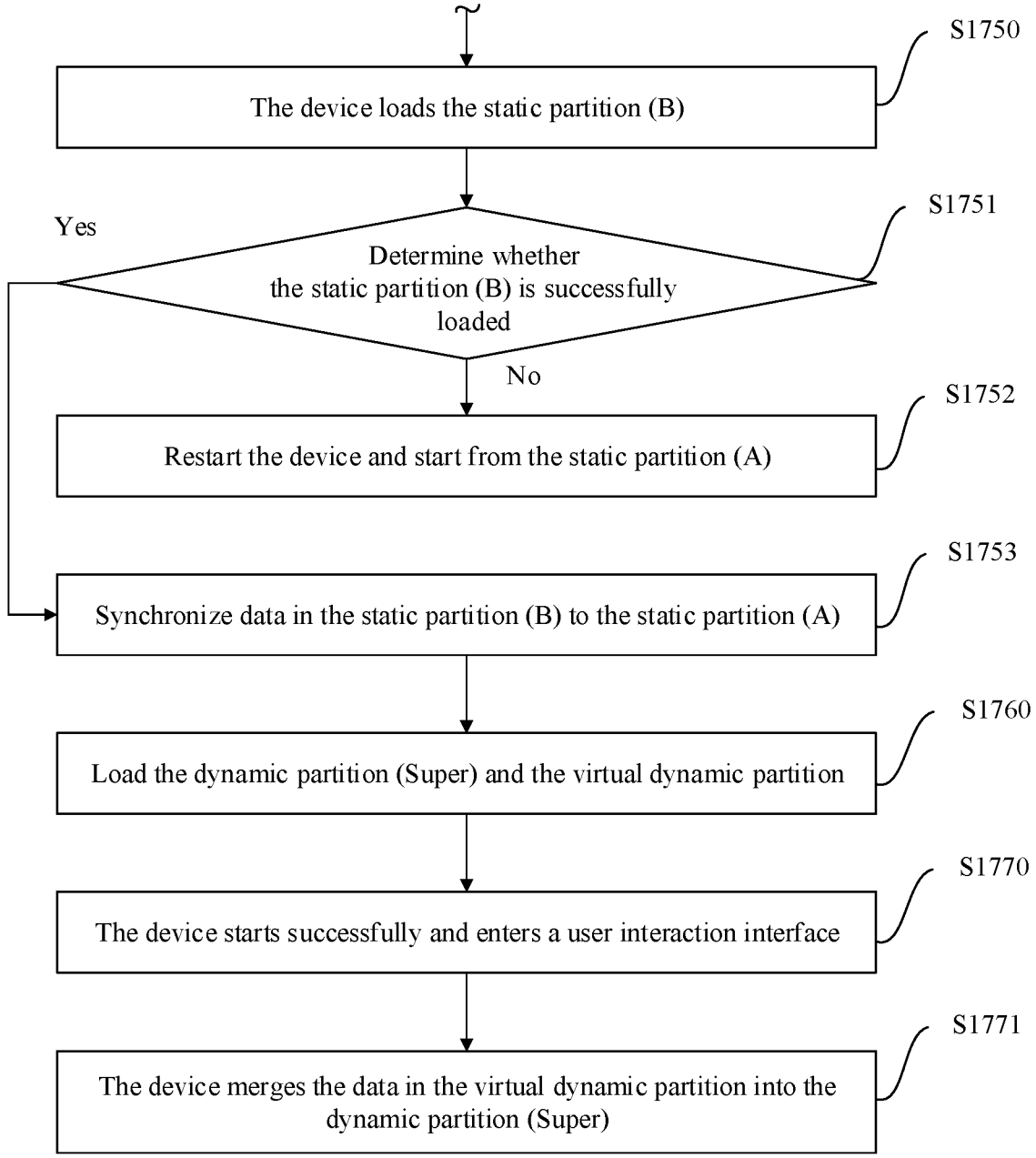

FIG. 17A and FIG. 17B are a flowchart of operating system upgrade according to an embodiment of this application. When the device currently starts from the static partition (A), the device upgrades the operating system and synchronizes the static partition according to a procedure shown in FIG. 17A and FIG. 17B.

For S1700 to S1732, refer to S500 to S532.

S1740: The device loads the basic partition (Common).

S1750: The device loads the static partition (B).

S1751: Determine whether the static partition (B) is successfully loaded.

If the static partition (B) fails to be loaded, S1752 is performed: Restart the device and start from the static partition (A).

If the static partition (B) is successfully loaded, S1753 is performed: Synchronize the data in the static partition (B) to the static partition (A). For execution of S1753, refer to S1311.

S1760: Load the dynamic partition (Super) and the virtual dynamic partition. For details, refer to S541.

S1770: The device starts successfully and enters a user interaction interface. For details, refer to S550.

S1771: The device merges the data in the virtual dynamic partition into the dynamic partition (Super). For details, refer to S551.

In the virtual A/B upgrade solution, after the device restarts and starts from the upgraded static partition, the device verifies a file that needs to be loaded for current system running in the dynamic partition and the virtual dynamic partition, and loads the file that needs to be loaded for current system running in the dynamic partition and the virtual dynamic partition only after the verification succeeds. If the verification fails, the device restarts and rolls back the system. In this case, the system upgrade fails.

Therefore, to avoid performing static partition synchronization when the upgrade fails, in an embodiment of this application, static partition synchronization is performed only after the file that needs to be loaded in the dynamic partition and the virtual dynamic partition is successfully verified or the file that needs to be loaded in the dynamic partition and the virtual dynamic partition is successfully loaded.

Figure 18A:
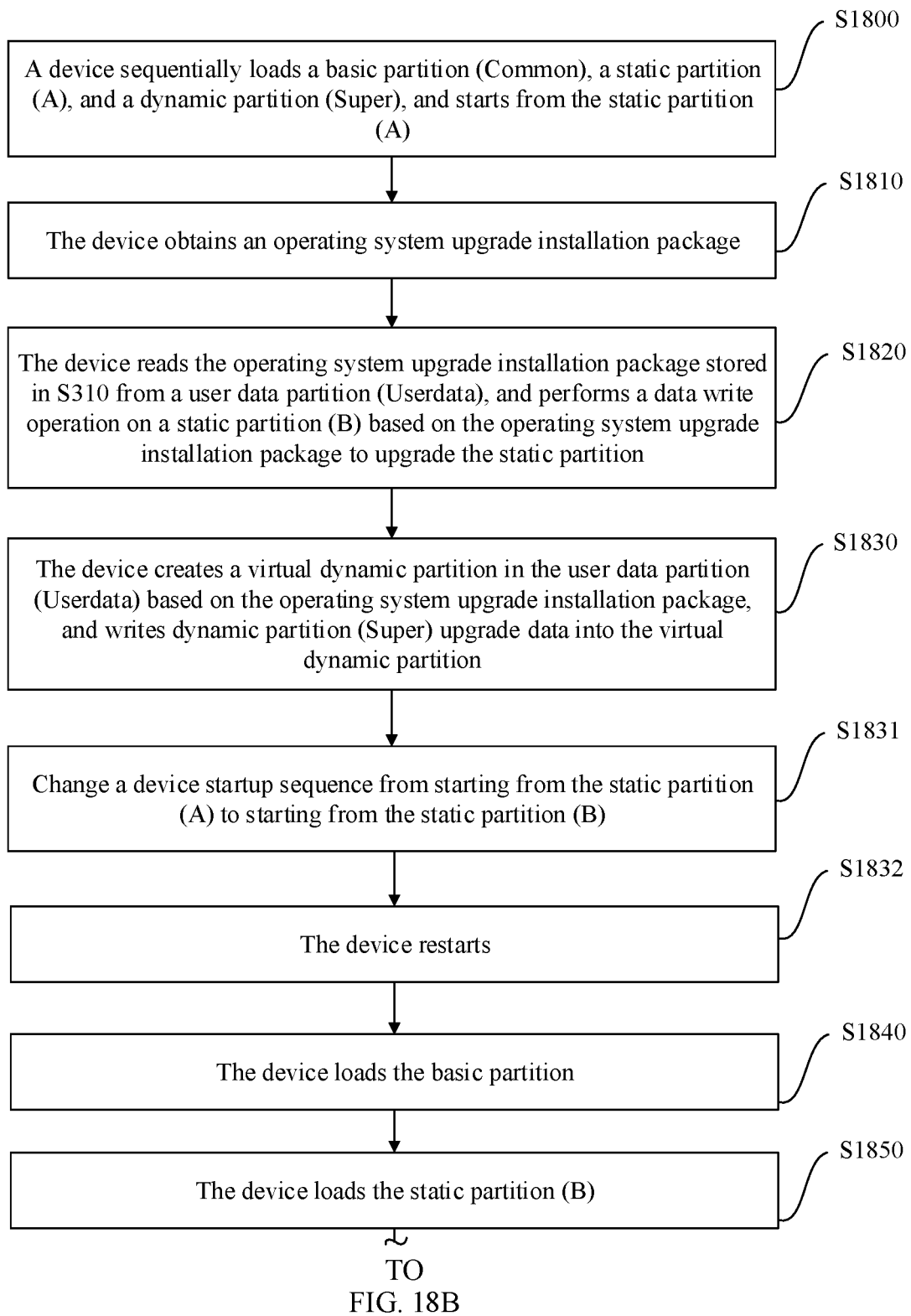
FIG. 18A and FIG. 18B are a flowchart of operating system upgrade according to an embodiment of this application.
Figure 18B:
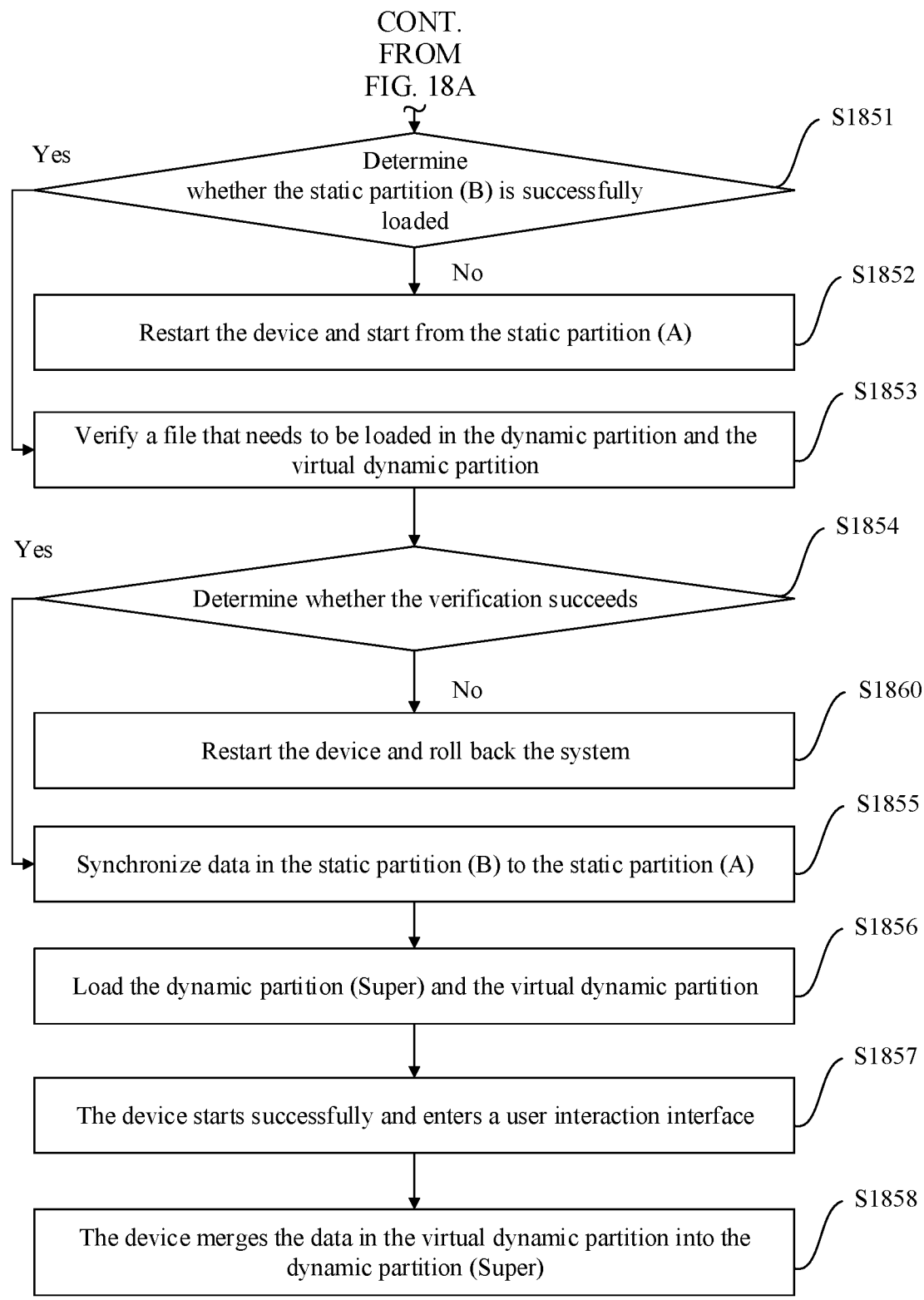

FIG. 18A and FIG. 18B are a flowchart of operating system upgrade according to an embodiment of this application. When the device currently starts from the static partition (A), the device upgrades the operating system and synchronizes the static partition according to a procedure shown in FIG. 18A and FIG. 18B.

For S1800 to S1852, refer to S1700 to S1752.

If the static partition (B) is successfully loaded, S1853 is performed: Verify the file that needs to be loaded in the dynamic partition and the virtual dynamic partition. For example, dmverity is used.

S1854: Determine whether the verification succeeds.

If the verification fails, S1860 is performed: Restart the device and roll back the system, for example, start from the static partition (A).

If the verification succeeds, S1855 is performed.

S1855: Synchronize the data in the static partition (B) to the static partition (A). For execution of S1855, refer to S1311.

For S1856 to S1858, refer to S1760 to S1771.

It may be understood that some or all steps or operations in the foregoing embodiments are merely examples. In embodiments of this application, another operation or various operation variants may further be performed. In addition, the steps may be performed in a sequence different from that presented in the foregoing embodiments, and it is possible that not all operations in the foregoing embodiments are necessarily performed.

Further, usually, whether improvement to a technology is hardware improvement (for example, improvement to a circuit structure such as a diode, a transistor, or a switch) or software improvement (improvement to a method procedure) can be clearly identified. However, with development of technologies, improvement to many existing method procedures can be considered as direct improvement to hardware circuit structures. Almost all designers obtain a corresponding hardware circuit structure by programming an improved method procedure into a hardware circuit. Therefore, improvement to a method procedure can be implemented by using a hardware entity module. For example, a programmable logic device (Programmable Logic Device, PLD) (for example, a field programmable gate array (Field Programmable Gate Array, FPGA)) is such an integrated circuit, and a logical function of the programmable logic device is determined by programming a component by an access party. A designer autonomously performs programming to "integrate" a digital apparatus onto a PLD, without requesting a chip manufacturer to design and manufacture a dedicated integrated circuit chip. In addition, currently, instead of manually producing an integrated circuit chip, such programming is usually implemented by using "logic compiler (logic compiler)" software, which is similar to a software compiler used during program development and writing. Original code to be compiled needs to be written in a specific programming language, which is referred to as a hardware description language (Hardware Description Language, HDL). There is not only one HDL, but there are many HDLs such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, VHDL (Very-High-Speed Integrated Circuit Hardware Description Language) and Verilog are most commonly used. It should also be clear to a person skilled in the art that a hardware circuit for implementing a logical method procedure can be easily obtained by performing slight logic programming on the method procedure by using the foregoing several hardware description languages and programming the method procedure into an integrated circuit.

Therefore, the method procedure provided in embodiments of this application may be implemented in a hardware manner. For example, a controller is used, and the controller controls a touchscreen to implement the method procedure provided in embodiments of this application.

The controller may be implemented in any suitable manner. For example, the controller may be in a form of a microprocessor or a processor and a computer-readable medium storing computer-readable program code (for example, software or firmware) that can be executed by the (micro) processor, a logic gate, a switch, an application-specific integrated circuit (Application-Specific Integrated Circuit, ASIC), a programmable logic controller, and an embedded microcontroller. Examples of the controller include but are not limited to the following microcontrollers: ARC 625D, Atmel AT91SAM, Microchip PIC18F26K20, and Silicone Labs C8051F320. A memory controller may further be implemented as a part of control logic of a memory. A person skilled in the art also knows that, in addition to implementing the controller by using only computer-readable program code, logic programming may be performed on a method step, so that the controller implements a same function in a form of a logic gate, a switch, an application-specific integrated circuit, a programmable logic controller, an embedded microcontroller, and the like. Therefore, the controller may be considered as a hardware component, and an apparatus that is included in the controller and that is configured to implement various functions may also be considered as a structure in the hardware component. Alternatively, an apparatus for implementing various functions may be considered as a software module that can implement a method or a structure in the hardware component.

Corresponding to the foregoing embodiment, this application further provides an electronic device. The electronic device includes a memory configured to store computer program instructions and a processor configured to execute the program instructions. When the computer program instructions are executed by the processor, the electronic device is triggered to perform the method steps described in embodiments of this application.

This application further provides a computer program product. The computer program product includes a computer program. When the computer program product runs on a computer, the computer is enabled to perform some or all steps provided in embodiments of this application.

A person skilled in the art may clearly understand that the technology in embodiments of the present invention may be implemented by using software and a necessary universal hardware platform. Based on such an understanding, the technical solutions in embodiments of the present invention essentially or the part contributing to the conventional technology may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the method described in embodiments of the present invention or some parts of the embodiments.

For a same or similar part between the embodiments in this specification, mutual reference may be made to the embodiments. In particular, for the apparatus embodiment and the terminal embodiment, because the apparatus embodiment and the terminal embodiment are basically similar to the method embodiment, descriptions are relatively simple. For related parts, refer to the descriptions in the method embodiment.

What is claimed is:

1. An operating system upgrade method, applied to an electronic device comprising a processor and a memory comprising a basic partition, a first static partition, a second static partition, a dynamic partition, and a user data partition, wherein the dynamic partition comprises a plurality of sub-partitions, the method comprises:
    running a first operating system by loading data in the basic partition, loading data in the first static partition, and loading data in the dynamic partition;
    obtaining a first upgrade installation package comprising a first upgrade file for a first sub-partition of the dynamic partition;
    creating a virtual dynamic partition in the user data partition, and storing the first upgrade file in the virtual dynamic partition wherein the basic partition includes metadata showing a merging status for the first upgrade file;
    modifying a startup sequence of the electronic device from starting from the first static partition to starting from the second static partition;
    restarting the electronic device, and running the startup sequence by starting from the second static partition; and
        loading data in the basic partition;
        loading data in the second static partition;
        loading data in another sub-partition other than the first sub-partition in the dynamic partition, and loading the first upgrade file in the user data partition;
        starting up the electronic device;
        reading the merging status in the metadata in the basic partition;
        determining based on the merging status, a merge to be performed for the first upgrade file; and
        merging the first upgrade file in the user data partition in the virtual dynamic partition into the first sub-partition of the dynamic partition by writing the first upgrade file to the first sub-partition of the dynamic partition, and deleting the first upgrade file in the virtual dynamic partition in the user data partition and returning storage space used by the virtual dynamic partition to the user data partition.

2. The method according to claim 1, wherein before loading data in the second static partition, the method further comprises synchronizing data in the first static partition to the second static partition.

3. The method according to claim 2, wherein the synchronizing data in the first static partition to the second static partition comprises:
    reading data in each sub-partition of the first static partition; and
    overwriting the data in each sub-partition of the first static partition into a corresponding sub-partition in the second static partition.

4. The method according to claim 2, wherein synchronizing data in the first static partition to the second static partition comprises:
    calculating a hash value of data in a third sub-partition, wherein the third sub-partition is a sub-partition of the first static partition;
    calculating a hash value of data in a fourth sub-partition, wherein the fourth sub-partition is a sub-partition of the second static partition, and the fourth sub-partition corresponds to the third sub-partition; and
    overwriting the data in the third sub-partition into the fourth sub-partition when the hash value of the data in the third sub-partition is inconsistent with the hash value of the data in the fourth sub-partition.

5. The method according to claim 1, wherein
    the first upgrade installation package further comprises a second upgrade file, the second upgrade file is an upgrade file of a second sub-partition of the dynamic partition;
    the method further comprises storing the second upgrade file in the virtual dynamic partition;
    loading data in the dynamic partition comprises loading data in another sub-partition other than the first sub-partition and the second sub-partition in the dynamic partition, and loading the first upgrade file and the second upgrade file in the user data partition; and
    after loading data in the dynamic partition, the method further comprises merging the second upgrade file in the user data partition into the second sub-partition of the dynamic partition.

6. An electronic device comprising:
    a processor and a memory comprising a basic partition, a first static partition, a second static partition, a dynamic partition, and a user data partition, wherein the dynamic partition comprises a plurality of sub-partitions, and the processor is configured to execute software code stored in the memory, wherein when executed the electronic device loads data in the basic partition, the first static partition, and the dynamic partition after startup to run a first operating system; and
    after the first operating system is run, the electronic device performs the following steps:
    obtaining a first upgrade installation package comprising a first upgrade file for a first sub-partition of the dynamic partition;
    creating a virtual dynamic partition in the user data partition, and storing the first upgrade file in the virtual dynamic partition wherein the basic partition includes metadata showing a merging status for the first upgrade file;
    modifying a startup sequence of the electronic device from starting from the first static partition to starting from the second static partition;
    restarting the electronic device, and running the startup sequence by starting from the second static partition; and
        loading data in the basic partition;
        loading data in the second static partition;
        loading data in another sub-partition other than the first sub-partition in the dynamic partition, and loading the first upgrade file in the user data partition;
        starting up the electronic device;
        reading the merging status in the metadata in the basic partition;
        determining based on the merging status, a merge to be performed for the first upgrade file; and merging the first upgrade file in the user data partition by writing the first upgrade file to the first sub-partition of the dynamic partition, and deleting the first upgrade file in the virtual dynamic partition in the user data partition and returning storage space used by the virtual dynamic partition to the user data partition.

7. The electronic device according to claim 6, wherein before loading data in the second static partition, the electronic device is further configured to synchronize data in the first static partition to the second static partition.

8. The electronic device according to claim 7, wherein the synchronizing data in the first static partition to the second static partition comprises:
reading data in each sub-partition of the first static partition; and
overwriting the data in each sub-partition of the first static partition into a corresponding sub-partition in the second static partition.

9. The electronic device according to claim 7, wherein synchronizing data in the first static partition to the second static partition comprises:
calculating a hash value of data in a third sub-partition, wherein the third sub-partition is a sub-partition of the first static partition;
calculating a hash value of data in a fourth sub-partition, wherein the fourth sub-partition is a sub-partition of the second static partition, and the fourth sub-partition corresponds to the third sub-partition; and
overwriting the data in the third sub-partition into the fourth sub-partition when the hash value of the data in the third sub-partition is inconsistent with the hash value of the data in the fourth sub-partition.

10. The electronic device according to claim 6, wherein after the first upgrade installation package is obtained, data in the first static partition is synchronized to the second static partition.

11. The electronic device according to claim 6, wherein before obtaining the first upgrade installation package, the electronic device is further configured to:
load data in the basic partition, the second static partition, and the dynamic partition to run a second operating system;
obtain a second upgrade installation package, wherein the second upgrade installation package comprises static partition upgrade data;
upgrade data in the first static partition based on the static partition upgrade data;
modify the startup sequence of the electronic device from starting from the second static partition to starting from the first static partition;
restart the electronic device, and determine that a current startup sequence is starting from the first static partition; and
load the data in the basic partition, the first static partition, and the dynamic partition to run the first operating system, wherein
after the electronic device is restarted and it is determined that the current startup sequence is starting from the first static partition, the data in the first static partition is synchronized to the second static partition.

12. The electronic device according to claim 11, wherein loading the data in the first static partition comprises synchronizing the data in the first static partition to the second static partition after static partition data verification succeeds.

13. The electronic device according to claim 11, wherein loading data in the dynamic partition comprises synchronizing the data in the first static partition to the second static partition after verification on a to-be-loaded dynamic partition file succeeds.

14. The electronic device according to claim 11, wherein the second upgrade installation package further comprises dynamic partition upgrade data;
before restarting the electronic device, and determining that the current startup sequence is starting from the first static partition, the electronic device is further configured to create a virtual dynamic partition in the user data partition, and storing the dynamic partition upgrade data in the virtual dynamic partition;
after loading the data in the basic partition, the first static partition, and the dynamic partition to run the first operating system, the electronic device is further configured to merge the dynamic partition upgrade data into the dynamic partition, wherein
after the dynamic partition upgrade data is merged into the dynamic partition, the data in the first static partition is synchronized to the second static partition.

15. The electronic device according to claim 6, wherein creating the virtual dynamic partition in the user data partition, and storing the first upgrade file in the virtual dynamic partition comprises storing the first upgrade file in the user data partition in a form of a COW file; and
loading data in the dynamic partition comprises loading, based on a snapshot technology, a file that needs to be loaded in the COW file of the first upgrade file and the dynamic partition.

16. The electronic device according to claim 6, wherein the first upgrade installation package further comprises a second upgrade file of a second sub-partition of the dynamic partition;
the electronic device is further configured to store the second upgrade file in the virtual dynamic partition;
loading data in the dynamic partition comprises loading data in another sub-partition other than the first sub-partition and the second sub-partition in the dynamic partition, and loading the first upgrade file and the second upgrade file in the user data partition; and
after loading data in the dynamic partition, the electronic device is further configured to merge the second upgrade file in the user data partition into the second sub-partition of the dynamic partition.

17. The electronic device according to claim 6, wherein the first upgrade installation package further comprises a static partition association file associated with the first sub-partition, and before the electronic device is restarted, and it is determined that a current startup sequence is starting from the second static partition, the data in the first static partition is synchronized to the second static partition; and
before restarting the electronic device, and determining that the current startup sequence is starting from the second static partition, and after the synchronizing data in the first static partition to the second static partition, the electronic device is further configured to update a static partition association file in the second static partition by using the static partition association file in the first upgrade installation package.

18. The electronic device according to claim 17, wherein after restarting the electronic device, and determining that a current startup sequence is starting from the second static partition, the electronic device is further configured to synchronize the data in the second static partition to the first static partition.

19. A non-transitory computer-readable storage medium, wherein the computer-readable storage medium stores a computer program, and when the computer program is run on a computer comprising a processor and a memory comprising a basic partition, a first static partition, a second static partition, a dynamic partition, and a user data partition, wherein the dynamic partition comprises a plurality of sub-partitions, the computer is enabled to perform the following steps:

running a first operating system by loading data in the basic partition, loading data in the first static partition, and loading data in the dynamic partition;

obtaining a first upgrade installation package comprising a first upgrade file for a first sub-partition of the dynamic partition;

creating a virtual dynamic partition in the user data partition, and storing the first upgrade file in the virtual dynamic partition wherein the basic partition includes metadata showing a merging status for the first upgrade file;

modifying a startup sequence of an electronic device from starting from the first static partition to starting from the second static partition;

restarting the electronic device, and running the startup sequence by starting from the second static partition; and loading data in the basic partition;

loading data in the second static partition;

loading data in another sub-partition other than the first sub-partition in the dynamic partition, and loading the first upgrade file in the user data partition;

starting up the electronic device;

reading the merging status in the metadata in the basic partition;

determining based on the merging status, a merge to be performed for the first upgrade file; and merging the first upgrade file in the user data partition in the virtual dynamic partition into the first sub-partition of the dynamic partition by writing the first upgrade file to the first sub-partition of the dynamic partition, and deleting the first upgrade file in the virtual dynamic partition in the user data partition and returning storage space used by the virtual dynamic partition to the user data partition.

* * * * *

UNITED STATES PATENT AND TRADEMARK OFFICE
CERTIFICATE OF CORRECTION

| | | |
|---|---|---|
| PATENT NO. | : 12,367,027 B2 | Page 1 of 1 |
| APPLICATION NO. | : 17/922087 | |
| DATED | : July 22, 2025 | |
| INVENTOR(S) | : Yanzhao Wang et al. | |

It is certified that error appears in the above-identified patent and that said Letters Patent is hereby corrected as shown below:

In the Claims

In Column 35, Claim 19, Line 10, delete "the" and insert -- a --, therefor.

In Column 35, Claim 19, Line 11, delete "the" and insert -- a --, therefor.

In Column 35, Claim 19, Line 12, delete "the" and insert -- a --, therefor.

Signed and Sealed this
Sixteenth Day of December, 2025

John A. Squires
*Director of the United States Patent and Trademark Office*